United States Patent
Neylan et al.

(10) Patent No.: US 10,839,148 B2
(45) Date of Patent: Nov. 17, 2020

(54) COORDINATION OF STORYLINE CONTENT COMPOSED IN MULTIPLE PRODUCTIVITY APPLICATIONS

(71) Applicant: MICROSOFT TECHNOLOGY LICENSING, LLC, Redmond, WA (US)

(72) Inventors: Catherine W. Neylan, Seattle, WA (US); Samuel Ying-Lam Cheung, Vancouver (CA); Peter Fintan Leonard, Seattle, WA (US); Liyin Xue, Kirkland, WA (US); Jennifer Michelstein Halberstam, Kirkland, WA (US); Erez Kikin-Gil, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 8 days.

(21) Appl. No.: 15/796,712

(22) Filed: Oct. 27, 2017

(65) Prior Publication Data
US 2019/0129929 A1     May 2, 2019

(51) Int. Cl.
*G06F 17/00*     (2019.01)
*G06F 40/18*     (2020.01)
(Continued)

(52) U.S. Cl.
CPC ............ *G06F 40/18* (2020.01); *G06F 3/0483* (2013.01); *G06F 16/4393* (2019.01);
(Continued)

(58) Field of Classification Search
CPC ...... G06F 17/24; G06F 17/211; G06F 17/212; G06F 3/147; G06F 3/04842; G06F 8/33;
(Continued)

(56) References Cited

U.S. PATENT DOCUMENTS

| 5,669,005 | A |   | 9/1997 | Curbow et al. |
| 6,023,714 | A | * | 2/2000 | Hill ...................... G06F 17/211 715/235 |

(Continued)

OTHER PUBLICATIONS

William, "Sharpcloud—Story Telling Software", Retrieved From <<https://www.i3p.org.uk/2015/12/04/sharpcloud-story-telling-software/>>, Dec. 4, 2015, 5 Pages.
(Continued)

*Primary Examiner* — Andrew T McIntosh
(74) *Attorney, Agent, or Firm* — Newport IP, LLC; Scott Y. Shigeta

(57) ABSTRACT

A system for composing storyline content in multiple productivity applications is provided. The productivity applications are each configured with an authoring pane and a storyline pane. Each productivity application has an authoring pane configured to display and edit the contents of a particular file type. Portions of the content displayed in the authoring pane are selected for the purposes of composing a presentation and the selected content is displayed in the storyline pane. The storyline pane of each application is synchronized to enable users to work within each application and view a current version of the presentation that is being composed while also viewing authored content specific to each application. The selected content displayed in a storyline pane can be used to generate formatted storyline data. The storyline data can be in a Web-based format, a presentation file, a multi-frame image file, a video file, or any other suitable format.

20 Claims, 22 Drawing Sheets

(51) Int. Cl.
*G06F 40/103* (2020.01)
*G06F 40/106* (2020.01)
*G06F 40/166* (2020.01)
*G06F 40/174* (2020.01)
*G06F 16/438* (2019.01)
*G06F 3/0483* (2013.01)

(52) U.S. Cl.
CPC .......... *G06F 40/103* (2020.01); *G06F 40/106* (2020.01); *G06F 40/166* (2020.01); *G06F 40/174* (2020.01)

(58) Field of Classification Search
CPC ........... G06F 2203/04803; G06F 40/18; G06T 11/60; G06Q 30/0631
See application file for complete search history.

(56) References Cited

U.S. PATENT DOCUMENTS

| | | | |
|---|---|---|---|
| 7,415,481 B2 | 8/2008 | Becker et al. | |
| 8,108,779 B1* | 1/2012 | Rein | G06F 16/40 715/743 |
| 8,745,483 B2 | 6/2014 | Chavoustie et al. | |
| 9,058,409 B2 | 6/2015 | Chakra et al. | |
| 9,483,457 B2 | 11/2016 | Presler-Marshall et al. | |
| 2003/0007013 A1* | 1/2003 | Gatis | G06F 17/21 715/853 |
| 2010/0138784 A1* | 6/2010 | Colley | G06F 3/04883 715/810 |
| 2011/0043652 A1* | 2/2011 | King | G06F 17/2211 348/222.1 |
| 2013/0086460 A1 | 4/2013 | Folting et al. | |
| 2013/0097490 A1 | 4/2013 | Kotler et al. | |
| 2013/0124957 A1 | 5/2013 | Oppenheimer et al. | |
| 2014/0372850 A1 | 12/2014 | Campbell et al. | |
| 2016/0224535 A1 | 8/2016 | Mathur et al. | |
| 2016/0292151 A1 | 10/2016 | Shukla | |
| 2016/0314348 A1* | 10/2016 | Wang | G06K 9/00442 |
| 2017/0220546 A1* | 8/2017 | Codrington | G06F 3/0484 |

OTHER PUBLICATIONS

"International Search Report and Written Opinion Issued in PCT Application No. PCT/US2018/049820", dated Dec. 12, 2018, 12 Pages.

* cited by examiner

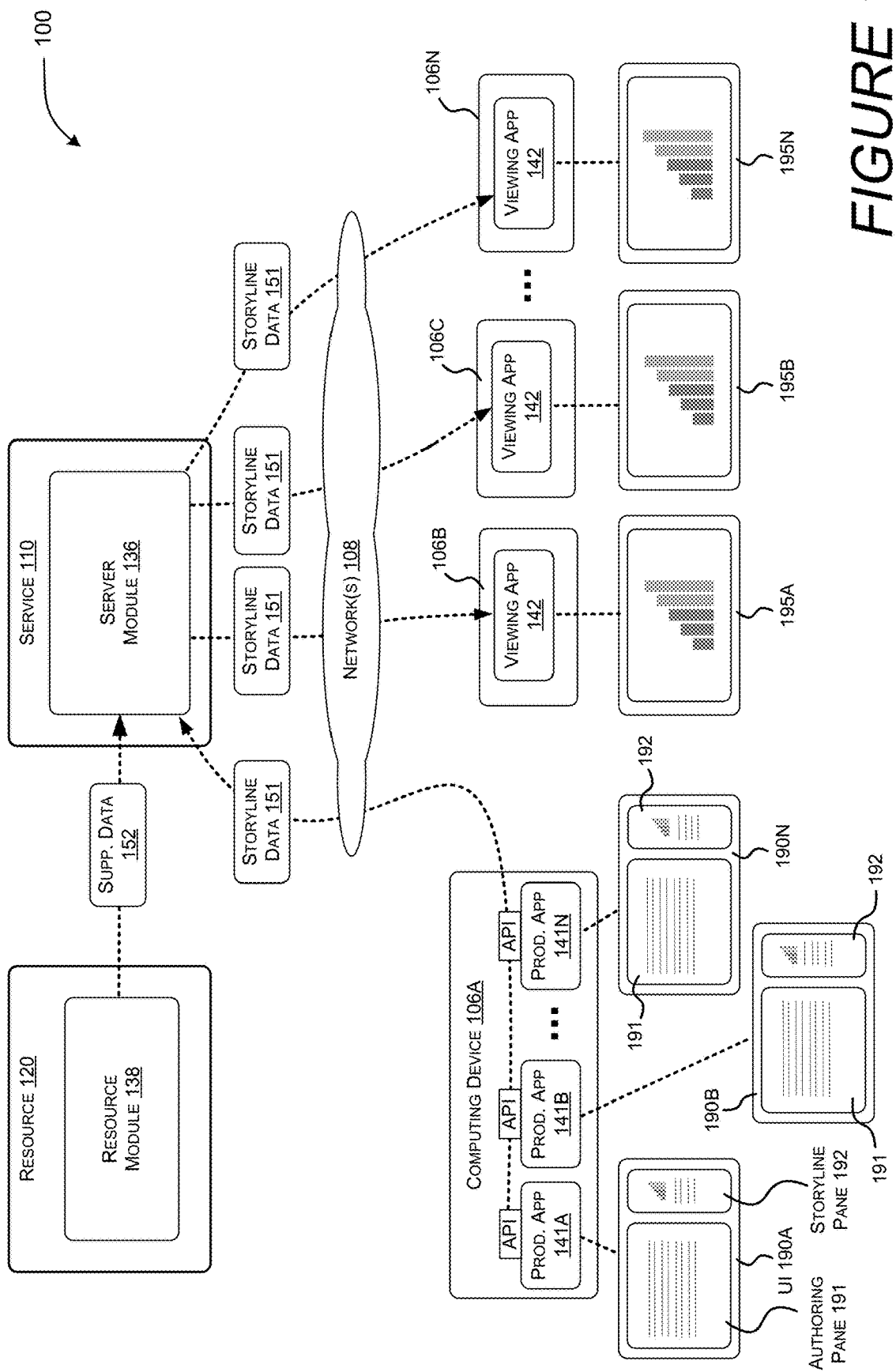

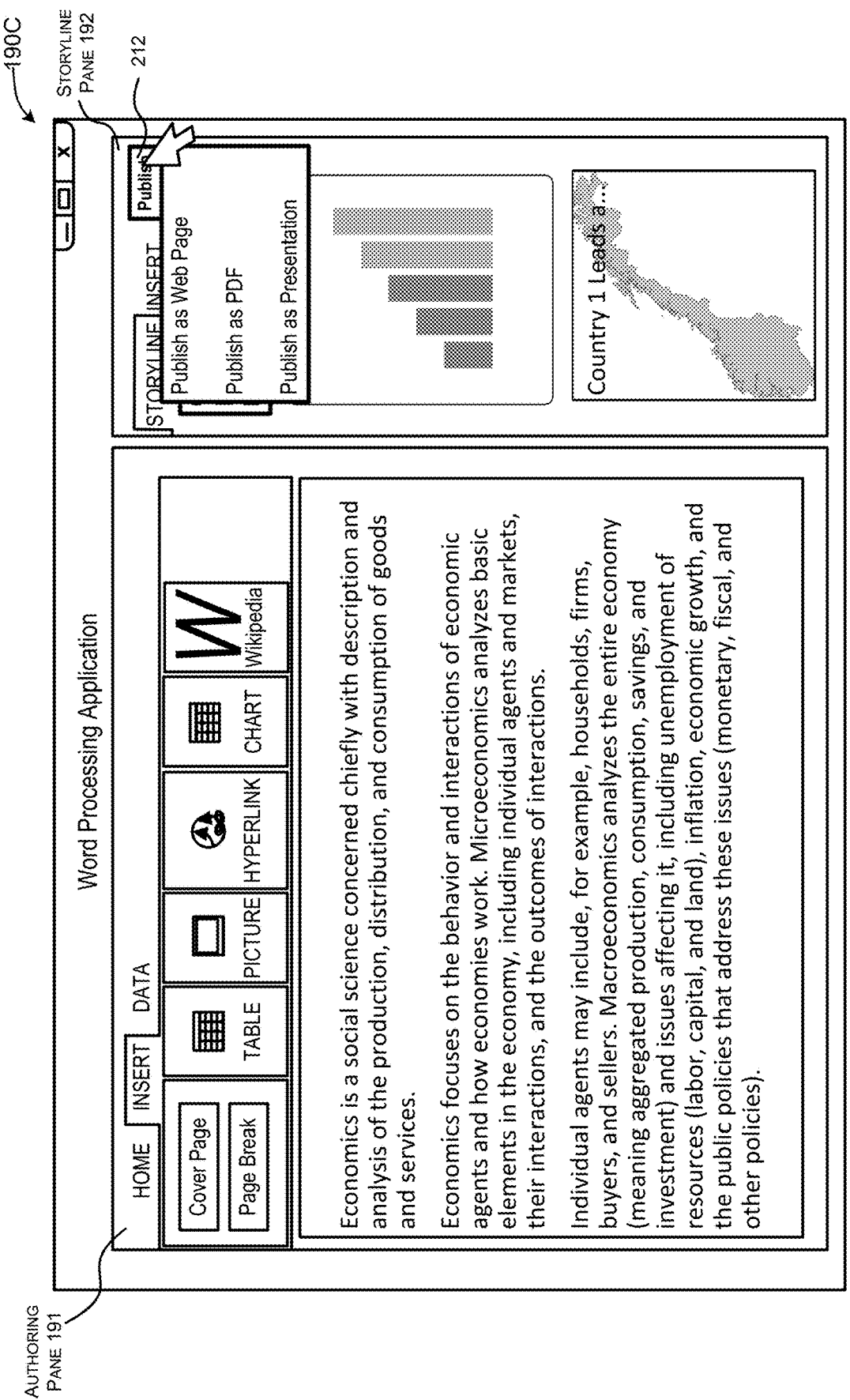

LINKED DATA OF PRESENTATION FROM SLIDE 1

| | A | B | C | D | E | F |
|---|---|---|---|---|---|---|
| | COUNTRY | POPULATION | BIRTH RATE | GDP | | |
| 1 | Country 1 | 499,000 | 10 | 370 | | |
| 2 | Country 2 | 220,700 | 15 | 294 | | |
| 3 | Country 3 | 24,040 | 11 | 193 | | |
| 4 | Country 4 | 858,000 | 12 | 167 | | |
| 5 | Country 5 | 848,000 | 22 | 133 | | |
| 6 | | | | | | |
| 7 | | | | | | |
| 8 | | | | | | |
| 9 | | | | | | |
| 10 | | | | | | |

FIGURE 3C

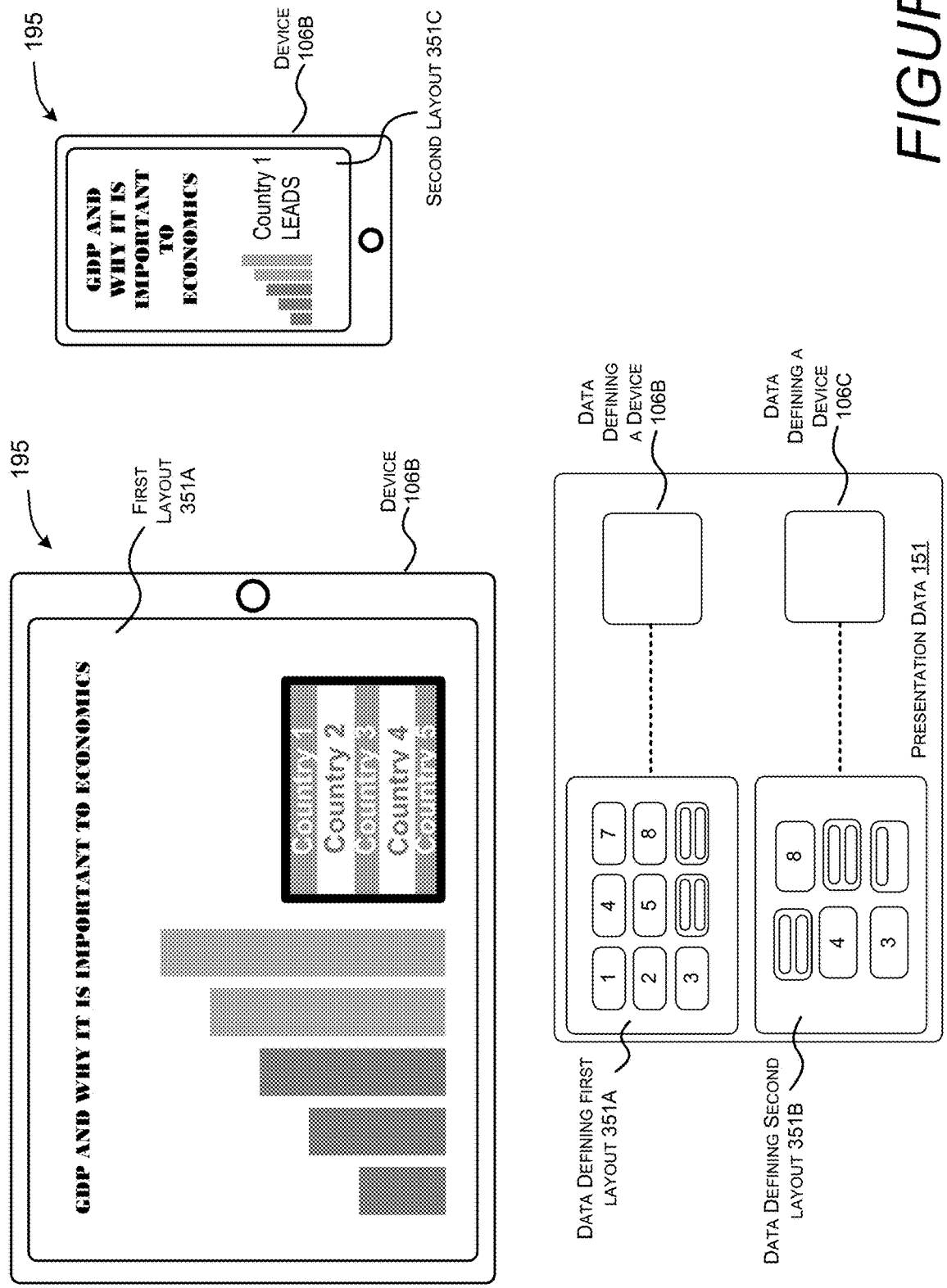

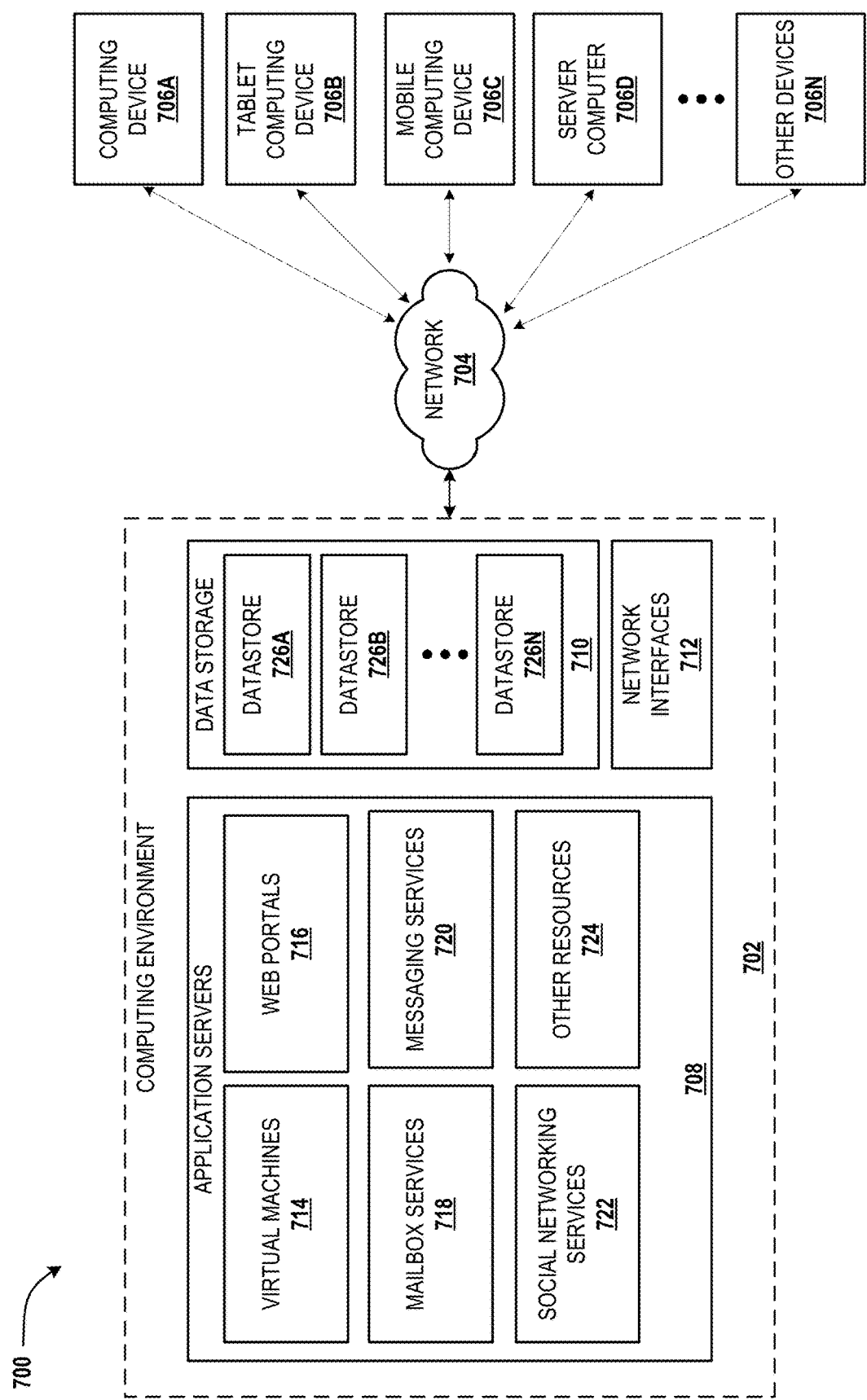

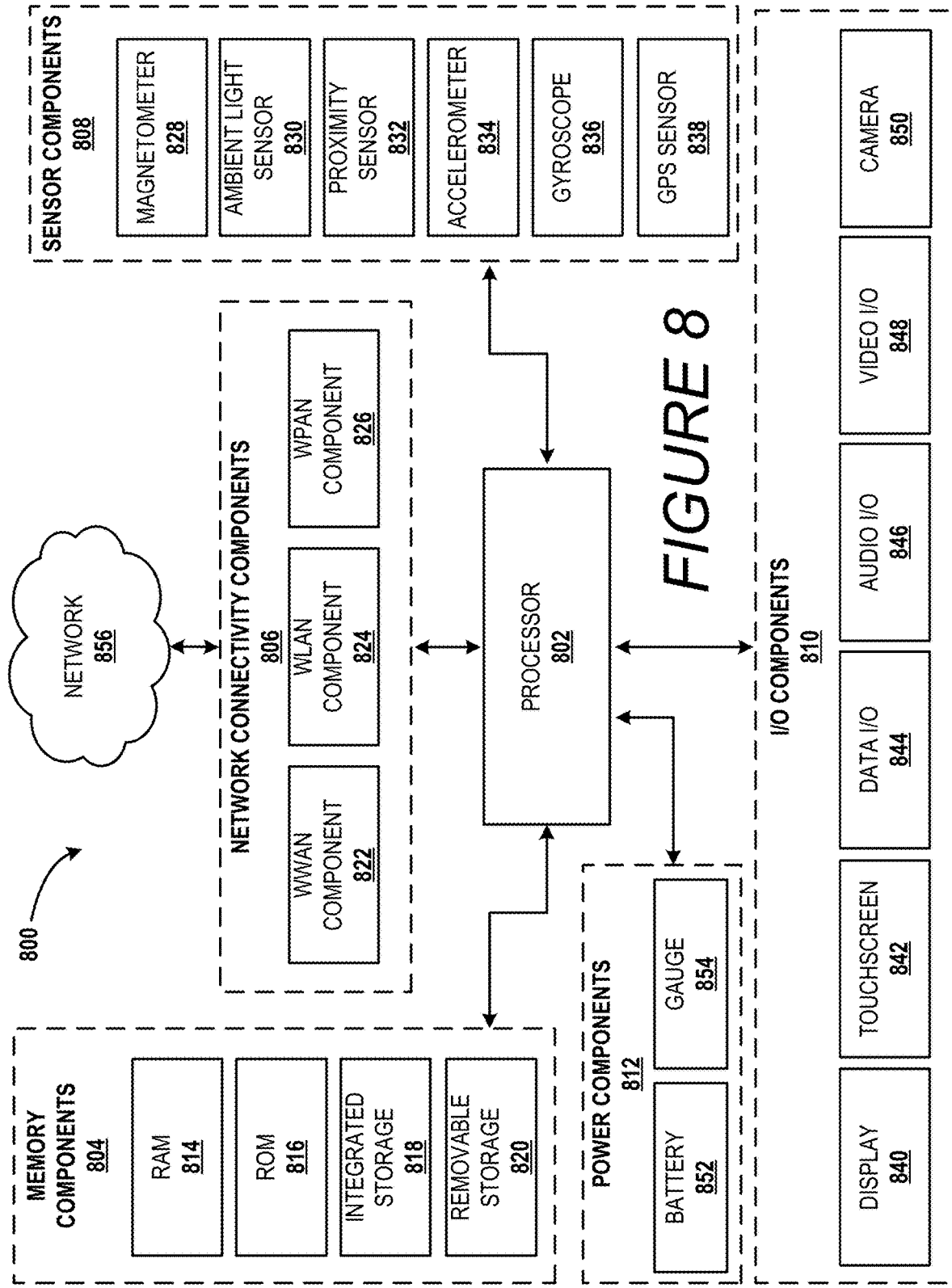

COORDINATION OF STORYLINE CONTENT COMPOSED IN MULTIPLE PRODUCTIVITY APPLICATIONS

BACKGROUND

In many productivity applications, such as Excel, OneNote, Pages, Numbers, Google Docs, and Google Sheets, each application has specialized tools for displaying and manipulating the contents of a particular file type. Although such applications can help users manipulate content that is stored as discrete items having different file types, most existing productivity applications cannot coordinate with one another when users need to build a coherent presentation narrative from multiple files associated with each application.

In order for users to create a coherent presentation narrative from content stored in different types of files, they need to manually export content from each file using different applications and manually compile the content using yet another application, such as PowerPoint. This cumbersome task leaves much to be desired, as some existing technologies require users to toggle through many different applications while coordinating the selection content from each application. Users are also required to manage the format of the content from each application to build a storyline having a coordinated logical flow. Such tasks that are required of each user introduce inefficiencies that can impact a user's productivity and creativity.

SUMMARY

The techniques disclosed herein enable the coordination of storyline content that is composed in multiple productivity applications and doing so while enabling a user to work within a contextual environment of each productivity application. For example, a user can build a presentation from content of multiple types of files while allowing the user to interact directly with each individual application, such as Excel, OneNote, and Word. The productivity applications are each configured with an authoring pane and a storyline pane. Each productivity application displays content of a particular type of file in the authoring pane. A user can select portions of the content displayed in the authoring pane to compose a presentation, and the selected content is displayed in the storyline pane. The storyline pane of each application is synchronized to enable users to work within each application and view a current version of the presentation that is being composed while also viewing authored content specific to each application.

The selected content displayed in a storyline pane can be used to generate formatted storyline data having assigned semantics and an organized presentation flow. In some configurations, the storyline data can be in a Web-based format that is published through a service. In other configurations, the storyline data can be in the form of a presentation file, a multi-frame image file, a video file, or any other suitable format.

In some embodiments, a system can identify or generate visualizations and other supplemental data associated with the selected content. For example, a computing device can determine a context of selected content, and by identifying a derived context or certain patterns of data, e.g., salient points, pivot chart attributes, type of formula used, and other predetermined patterns, the computing device can search for supplemental data, such as visual data, to be integrated into or linked to the storyline data. The supplemental data can be identified based on a number of factors, some of which may include results from data defining a previous analysis, similar or disparate workbooks, and/or other data sets. The supplemental data can be automatically integrated into a storyline pane as a recommendation or the supplemental data can be displayed in a preview interface for user selection. When the supplemental data is automatically integrated into a storyline pane, a computing device can display one or more visual indicators that enable a user to accept or reject the recommendation.

In some embodiments, the storyline data is configured to display different layouts depending on a viewing application, a device type, or device capabilities. For example, when a user views the storyline data on a laptop through a browser, the storyline may be presented in one particular layout. When the user views the same storyline data on a mobile device, the storyline may be presented in another layout. This feature enables devices to maximize the use of a display area by dynamically modifying the organization and flow of a presentation. This feature can be implemented by, for example, a presentation file (such as a Keynote file or a PowerPoint file) having multiple layouts, each associated with display parameters of a device, an application type, a device type, or device capabilities.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 1 is a block diagram of a system for enabling the generation of storyline content from multiple productivity applications.

FIG. 2I is a screenshot illustrating a display of supplemental data integrated into a storyline pane of an application.

FIG. 2K is a screenshot of a user interface showing how a user can select a format for storyline data to be generated.

FIG. 3C illustrates a rendering of linked data that is displayed in response to the selection of the user interface element shown in FIG. 3B.

FIG. 3D illustrates different layouts of storyline data that can be displayed on a computing device based on a device type or device capabilities, such as a screen size.

FIG. 7 is a diagram illustrating a distributed computing environment capable of implementing aspects of the techniques and technologies presented herein.

FIG. 8 is a computer architecture diagram illustrating a computing device architecture for a computing device capable of implementing aspects of the techniques and technologies presented herein.

DETAILED DESCRIPTION

Figure 2A:
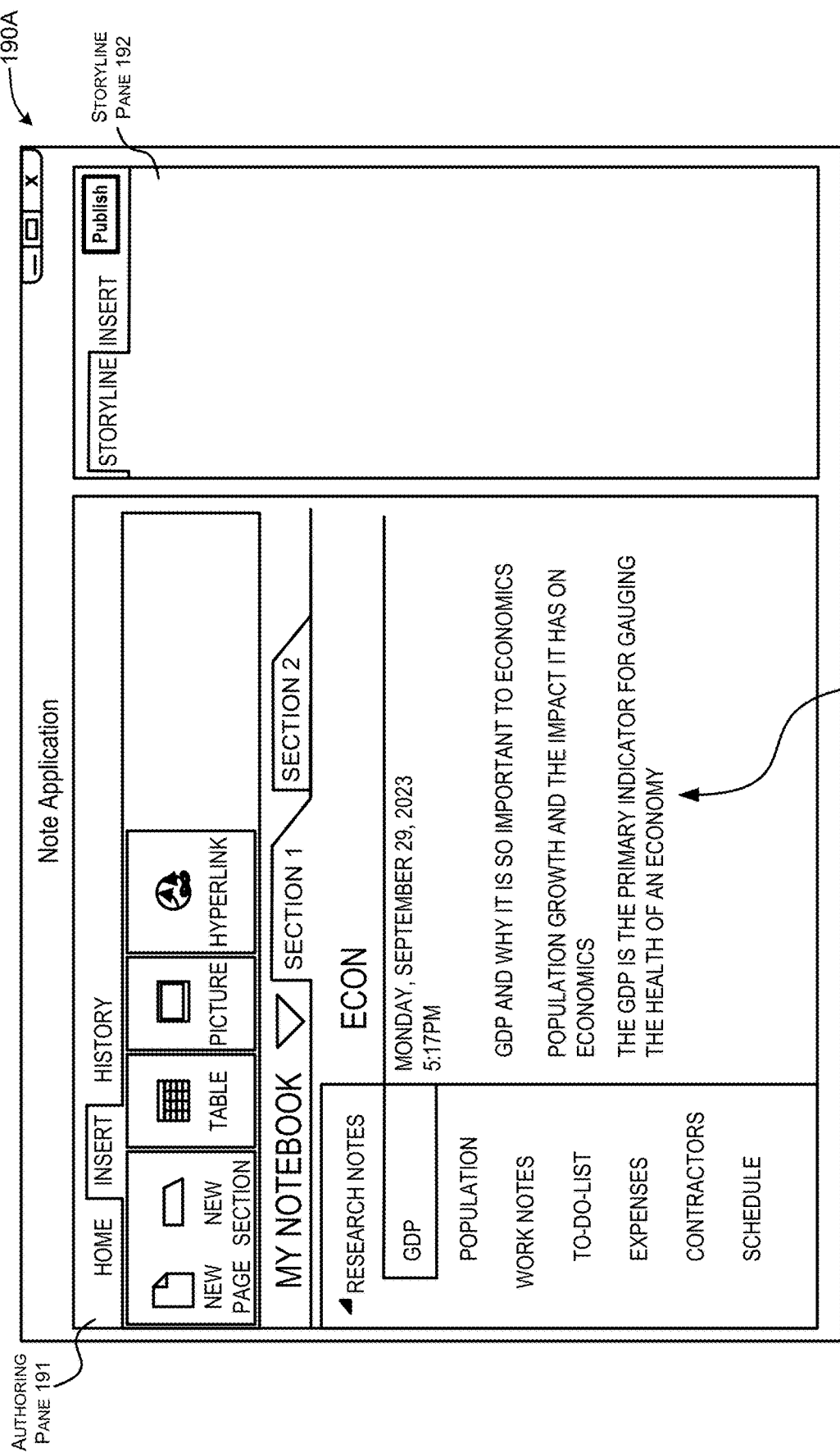
FIG. 2A is a screenshot of a user interface for a first application, the user interface comprising an authoring pane and a storyline pane.

FIG. 1 illustrates a system 100 for enabling the generation of storyline content from multiple productivity applications 141 and doing so while enabling a user to work within a contextual environment of each productivity application 141. In this example, a user can interact with an individual productivity application 141 to view and compile content stored in a particular type of file, e.g., a word processing document, a spreadsheet document, etc. The productivity applications 141 are each configured to display an authoring pane 191 and a storyline pane 192. The content of each file is displayed in the authoring pane 191. A user can select portions of content displayed in the authoring pane 191. The selected portions can be arranged in a storyline pane 192 of any application to build a presentation having a storyline flow. The storyline pane 192 of each application 141 is synchronized to enable a user to work within each application 141 and view a current version of a presentation, e.g., a storyline, they are compiling while also viewing authored content specific to each application.

The selected content compiled in the storyline pane 192 can be used to generate formatted storyline data 151 having assigned semantics and an organized presentation flow. The presentation flow can be based on an order of storyline items each containing discrete bundles of selected content. In some configurations, the storyline data 151 can be in a Web-based format that is published through a service. In other configurations, the storyline data 151 can be in the form of a presentation file, a multi-frame image file, a video file, or any other suitable format.

In some embodiments, a system 100 can identify or generate supplemental data associated with the selected content. For example, a computing device 106A or a service 110 can determine a context of the selected content, and by identifying certain patterns of data, e.g., salient points, associated pivot charts, type of formula used, and/or a derived context, a system can search for supplemental data. The supplemental data 152, such as visual data, can be selected based on a number of factors, some of which may include results from data defining a previous analysis, similar or disparate workbooks, and/or other data sets.

For illustrative purposes, supplemental data 152 can include text, images, media or any other form of data. The supplemental data 152 can include data that is stored within a service 110 or the supplemental data 152 can be retrieved from any suitable resource 120 comprising a resource module 138, such as a search engine, a social network, a database, a storage service, etc. In some illustrative examples, supplemental data 152 can include visualizations to be integrated into, or linked to, the storyline data 151.

The storyline data 151 can be communicated to any number of computing devices 106, referred to herein as computing devices 106B-106N, from a first computing device 106A or the service 110 via a network 108. Each computing device 106B-106N associated with a recipient can display the storyline data 151 on a user interface 195 (195A-195N) by the use of a viewing application 142. The viewing application 142 can be any suitable application such as a presentation program, a web browser, a media player, etc.

As described in more detail below, the storyline data 151 is configured to display different layouts depending on a device type or device capabilities. For example, when a user views the storyline data 151 on a laptop through a browser, the storyline may be presented in one particular layout. When the user views the same storyline data 151 on a mobile device, the storyline may be presented in another layout. This feature enables devices to maximize the use of a display area by dynamically modifying the organization and flow of a presentation.

It should be appreciated that the subject matter described herein may be implemented as a computer-controlled apparatus, a computer process, a computing system, or as an article of manufacture such as a computer-readable storage medium. Among many other benefits, the techniques shown herein improve efficiencies with respect to a wide range of computing resources. For instance, human interaction with a device may be improved, as the use of the techniques disclosed herein enable a user to view and edit data from a wide range of file types while operating in one application to compose a storyline that includes data from the files. In addition, improved human interaction improves other computing resources such as processor and network resources, e.g., users can work from a reduced number of applications and reduce a user's computer interaction, reduce the chances of an inadvertent input, reduce network traffic, and reduce computational cycles. The techniques disclosed herein reduce the need to download, start, maintain updates for, and toggle between, a number of applications, including a specialized presentation program. Also, instead of requiring users to copy and paste selected content into a specialized publication or presentation program, existing computer designs are improved in that all applications are synchronized and ultimately configured to improve the efficiency of a user's interactions. Other technical effects other than those mentioned herein can also be realized from implementations of the technologies disclosed herein.

Turning now to FIGS. 2A-2K, a number of screen shots are used to illustrate aspects of the system 100. This example involves a scenario where a user interacts with three different applications, each configured to author and manage information stored in different types of files. This example involves a note application, a spreadsheet application, and a word processing application. As shown, content is displayed in an authoring pane 191. Each application is configured to allow a selection of content within the authoring pane 191, and each application is configured to display the selected content in the storyline pane 192.

FIG. 2A is a screenshot of a user interface for the first application 141A, the note application. As shown, the user interface 190A is configured to display an authoring pane 191 and a storyline pane 192. The user interface 190A of the first application 141A displays content 201 in the authoring pane 191.

Figure 2B:
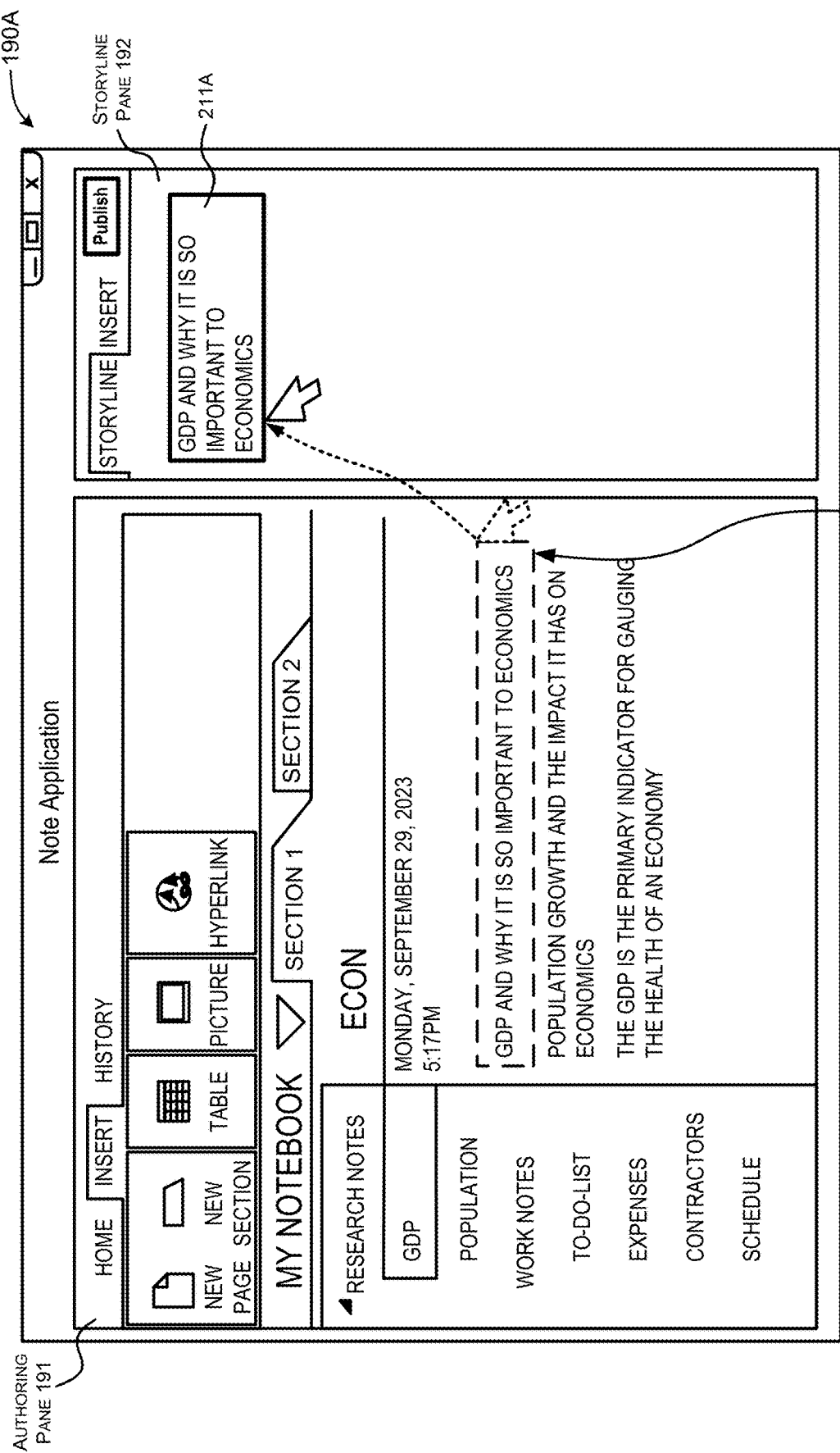
FIG. 2B is a screenshot of the user interface of FIG. 2A showing selected content in the authoring pane and a copy of the selected content positioned within the storyline pane.

FIG. 2B illustrates a process where a selection of the content 201 is identified. In this example, a specific section of text is selected by a user input, and that specific section of text is used to generate a first storyline item 211A, which is displayed in the storyline pane 192.

This example involves the use of a cursor that is controlled by an input device, such as a mouse or touchscreen. This example is for illustrative purposes and is not to be construed as limiting. It can be appreciated that any type of input device and any suitable user gesture, including a voice gesture, can be utilized to select a section of content 201 to create a storyline item 211A for display in the storyline pane 192. A gesture performed by the user can also be used to determine a position of the storyline item 211A relative to other storyline items.

Figure 2C:
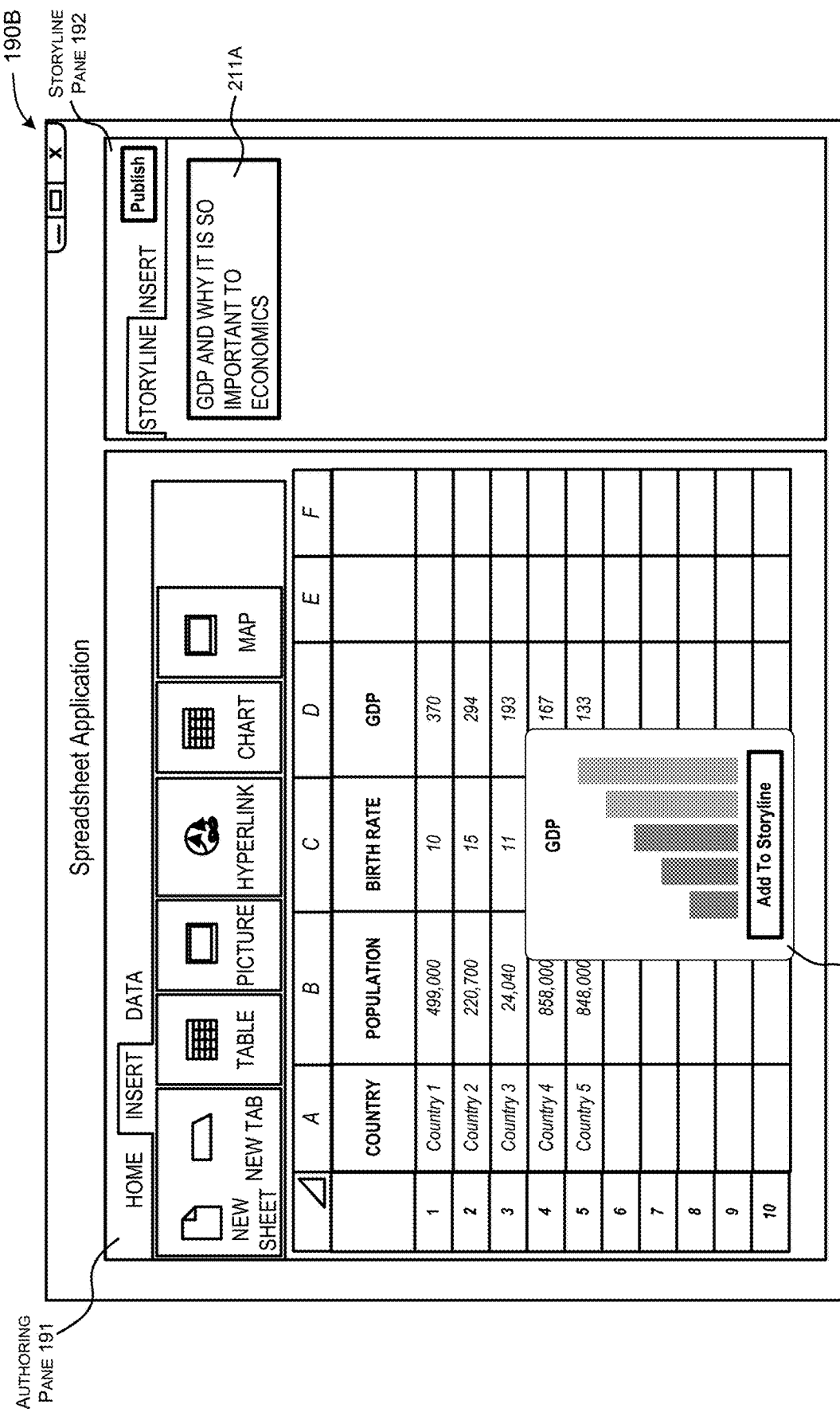
FIG. 2C is a screenshot of a user interface for a second application, the user interface comprising an authoring pane and a storyline pane.

FIG. 2C is a screenshot of a user interface 190B for the second application 141B, the spreadsheet application. As shown, the user interface 190B comprises an authoring pane 191 and a storyline pane 192. Also shown, the storyline pane 192 of the second application 141B displays content 203 in the authoring pane 191. Given that the storyline panes 192 are synchronized between each application, the first storyline item 211A is also displayed in the storyline pane 192 of the user interface 190B.

Figure 2D:
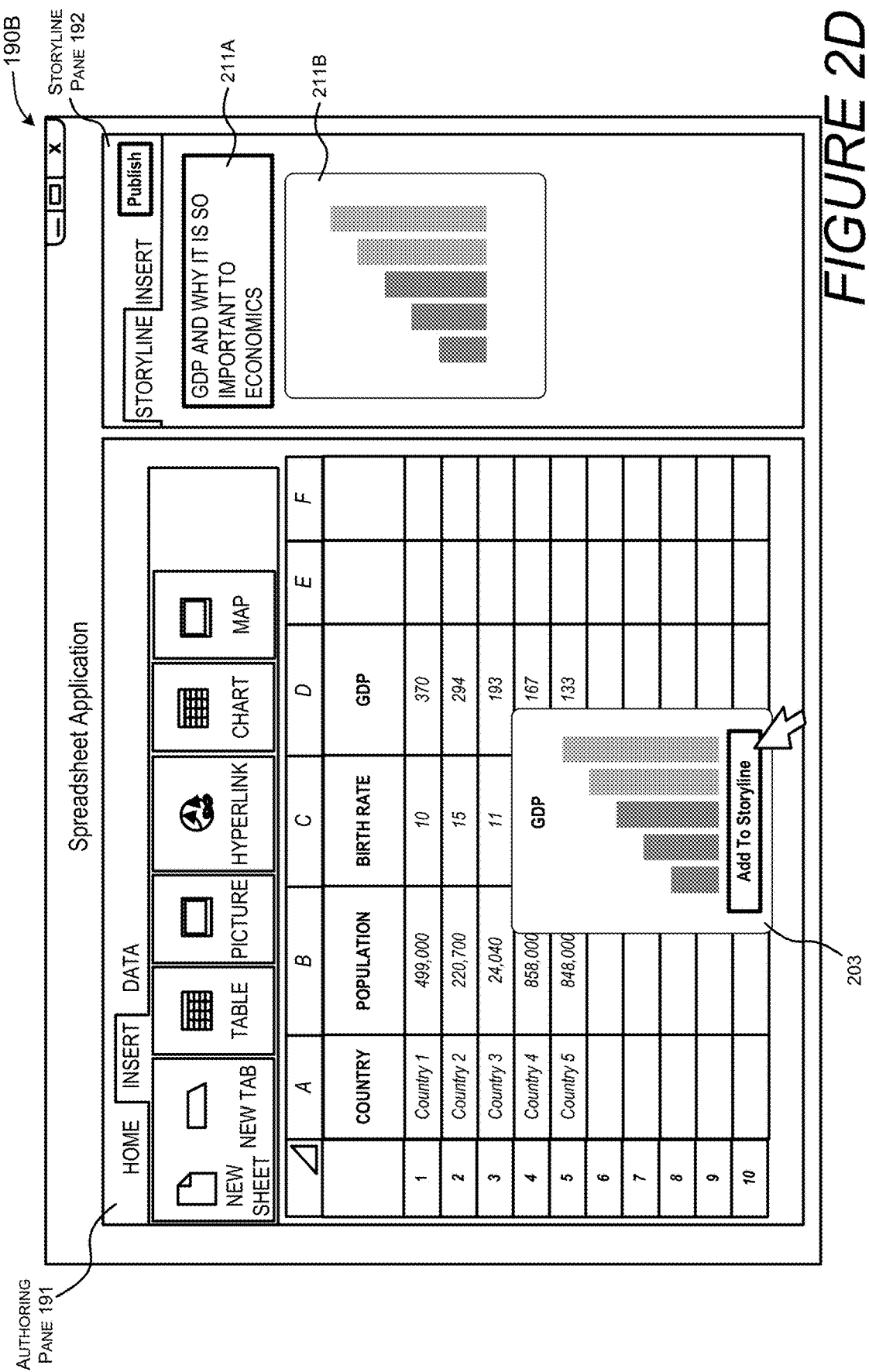
FIG. 2D is a screenshot of the user interface of FIG. 2C showing the selection of content in the authoring pane and the position of the content within the storyline pane.

FIG. 2D illustrates a process where a selection of the content 203 is identified. In this example, a graph is selected by a user input, and the graph, i.e., the selected content, is used to generate a second storyline item 211B, which displays the graph in the storyline pane 192. The second storyline item 211B is positioned after (below) the first storyline item 211A.

Figure 2E:
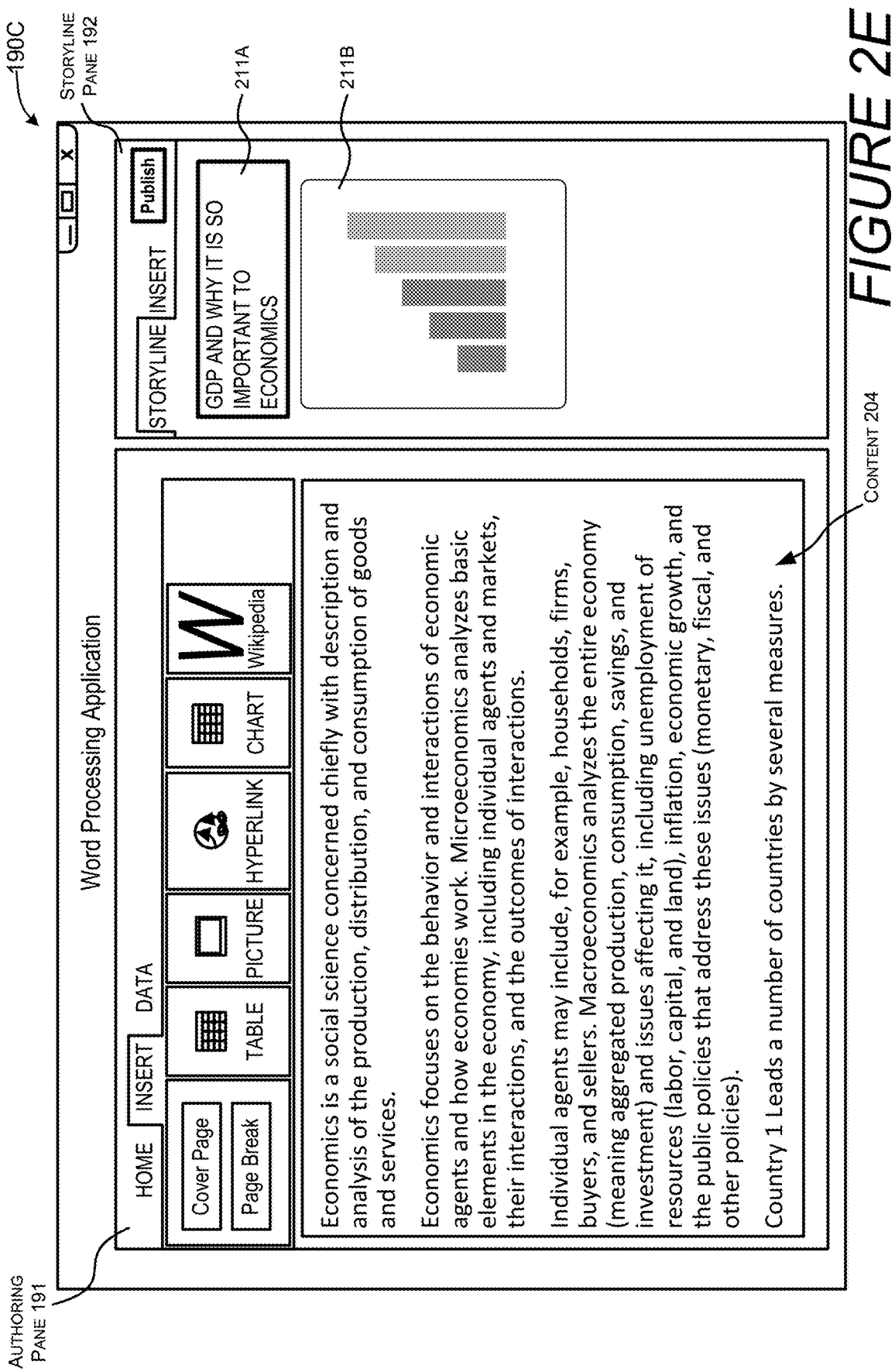
FIG. 2E is a screenshot of a user interface for a third application, the user interface comprising an authoring pane and a storyline pane.

FIG. 2E is a screenshot of a user interface 190C for the third application 141C, the word processing application. As shown, the user interface 190C comprises an authoring pane 191 and a storyline pane 192. Also shown, the storyline pane 192 of the third application 141C displays content 204 in the authoring pane 191. Since the system synchronizes the storyline panes 192 of each application, the first storyline item 211A and the second storyline item 211B are displayed in the storyline pane 192 of the user interface 190C.

Figure 2F:
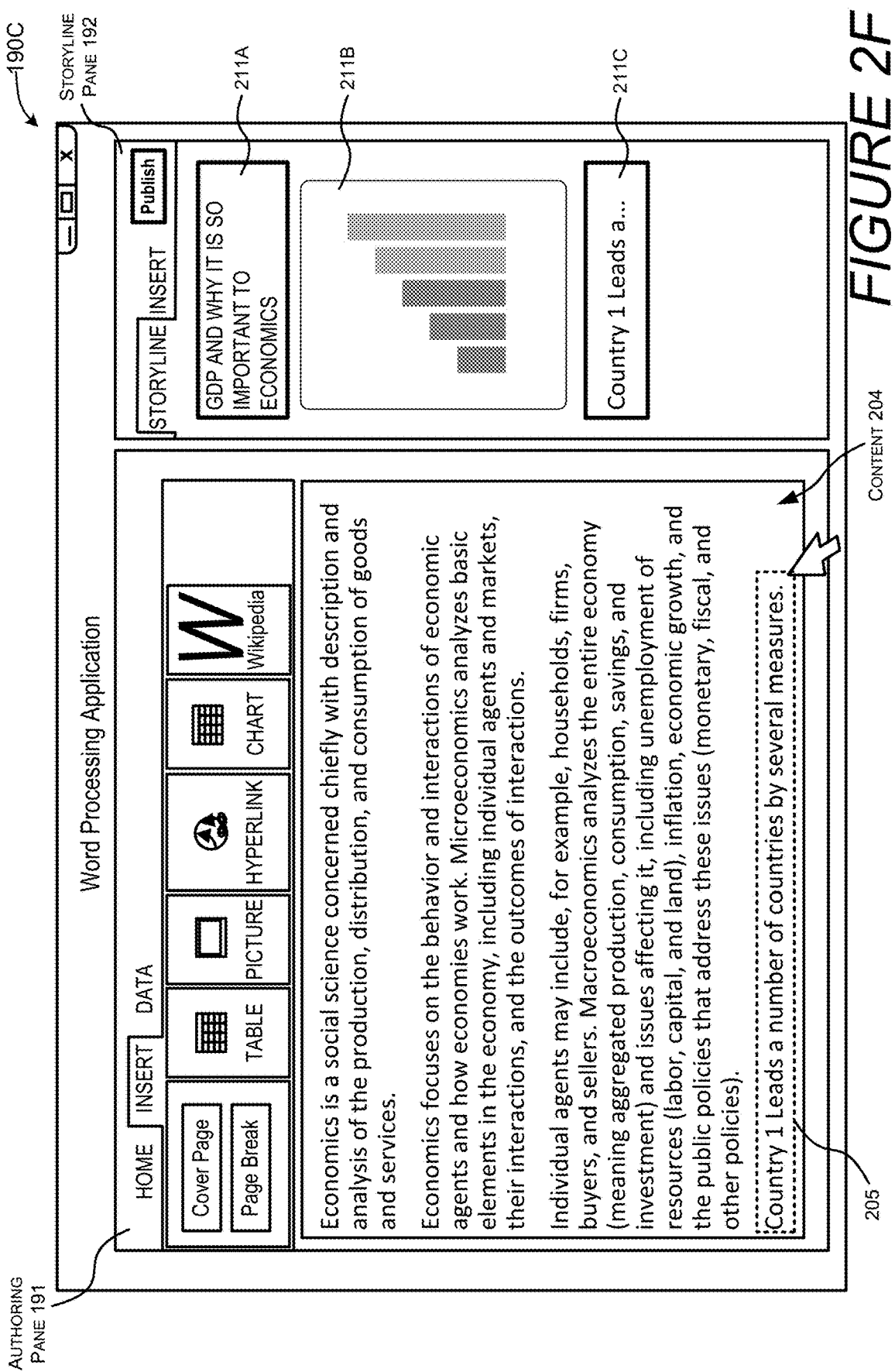
FIG. 2F is a screenshot of the user interface of FIG. 2E showing the selection of content in the authoring pane and the position of the content within the storyline pane.

FIG. 2F illustrates another example of a process where a selection of the content 204 is identified. In this example, a section of text 205 is selected by a user input, and that section of text 205 is used to generate a third storyline item 211C, which is displayed in the storyline pane 192.

Figure 2G:
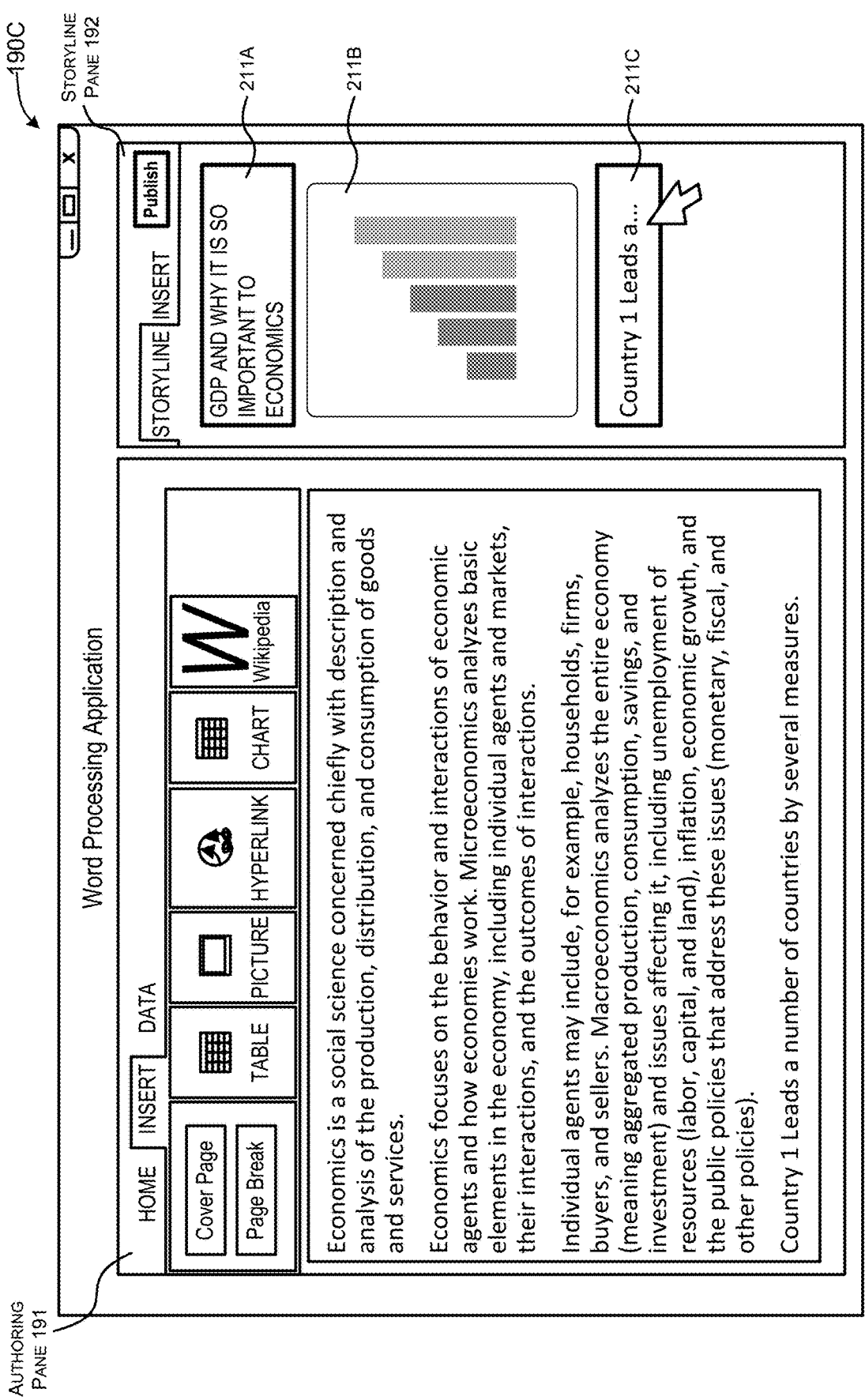
FIG. 2G is a screenshot of the user interface of FIG. 2F illustrating an example of a storyline item being selected to invoke a request for supplemental data associated with the storyline item.
Figure 2H:
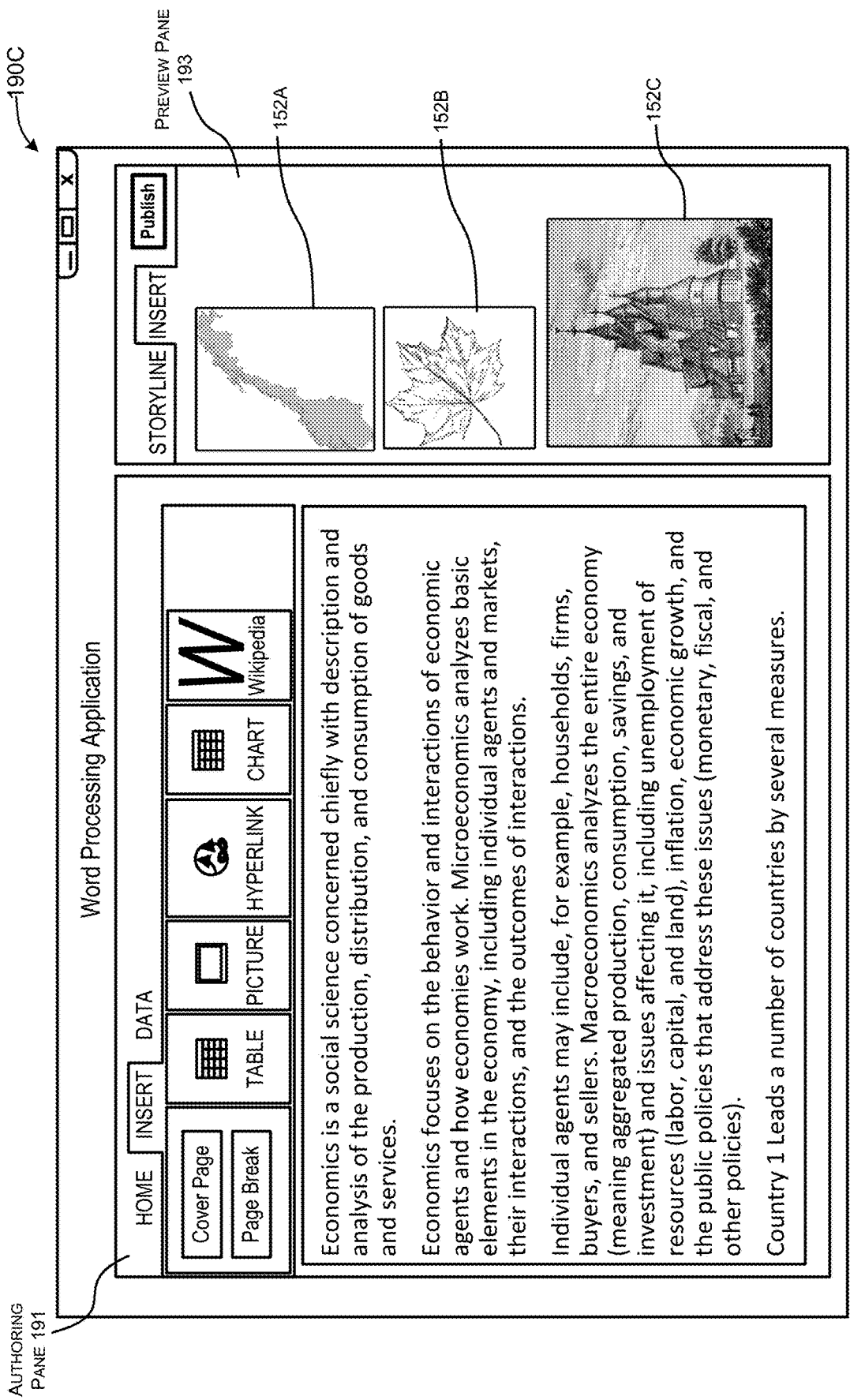
FIG. 2H is a screenshot of a user interface showing a preview of supplemental data displayed in the storyline pane, each item of supplemental data configured for user selection and integration into a storyline.
Figure 21:
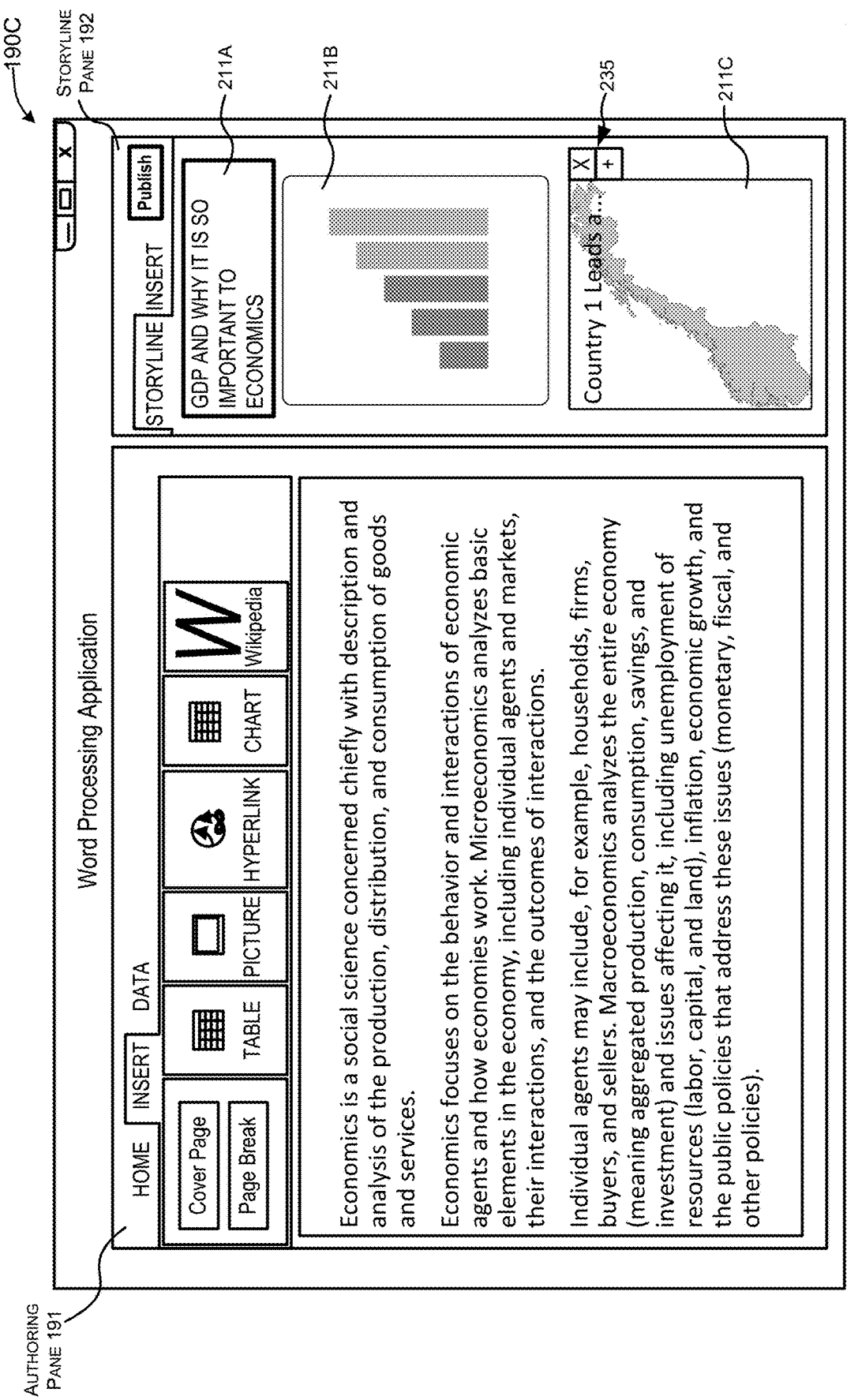

As summarized above, the system 100 can identify or generate visualizations and other supplemental data associated with the selected content. For example, a computing device 106A or a server module 136 of a service 110 can determine a context of the selected content, and by identifying certain patterns of data, e.g., salient points, pivot charts, type of formulas used, and other patterns or a derived context, the computing device can search for supplemental data 152, such as visualizations or other data, to be integrated into, or linked to, the storyline data 151. FIGS. 2G through 2I illustrate one example of how a user can interact with the system 100 to identify, select, and integrate the supplemental data.

FIG. 2G is a screenshot of the user interface 190C of the word processing application displaying three storyline items. In this example, supplemental data is retrieved in association with the third storyline item 211C. The supplemental data can be obtained in response to a selection of a storyline item. As shown, the user has selected the third storyline item 211C by the use of a pointing device. In response to the selection, the system 100 can generate a query for supplemental data related to the third storyline item 211C. The query can be based on the pattern of data, a contextual interpretation of the content, or any other technique for identifying related items. The supplemental data can be obtained by the service 110 or the computing device 106A from a local or remote resource 120. In this example, the text notes a particular country, listed as "Country 1," and the system retrieves images and other related data.

In another example, when the selected content is related to a formula, e.g., the selected content is a chart involving data formed in accordance with a formula, a query can include a description of the formula or data defining the formula. In response to the query, one or more resources, such as a search engine, a social network, or a data storage resource, to provide images related to the formula, updated versions of the formula, other data related to the formula, or other related supplemental.

In other examples, when the selected content can be related to other data or sources, e.g., a data source, a data type, an entity contained in the selected content, metadata associated with column headers, or metadata associated with row headers, the system 100 can generate a query related to the other data or sources. The query can then be sent to resources, such as a search engine, a social network, or a data storage resource to obtain related supplemental data.

Once the supplemental data is retrieved, the supplemental data 152 can be displayed in a preview interface for user selection. In the example shown in FIG. 2H, the supplemental data 152 is in the form of three images displayed in three discrete supplemental data items (152A-152C). In this example, the supplemental data is displayed in a preview pane 193. The user interface 190C can be configured to receive a selection of one or more supplemental data items. For purposes of illustrating this example, consider a scenario where a user selects the first supplemental data item 152A. As shown in FIG. 2I, in response to the selection, the first supplemental data item 152A is integrated into the storyline pane 192 in association with the selected storyline item, e.g., the third storyline item 211C.

The supplemental data can be associated with one or more storyline items in a number of ways. In some embodiments, the supplemental data can be visually associated with a storyline item. For example, the supplemental data can be rendered as an overlay or background with respect to a storyline item, as shown in FIG. 2I. Alternatively, the supplemental data can be located within a predetermined distance from the storyline item, etc. Any visual indicator or arrangement can be used to show an association between the supplemental data and a storyline item.

In some embodiments, the supplemental data can be automatically displayed in the storyline pane instead of using the preview pane shown in FIG. 2H. Such embodiments can improve the user experience by allowing users to see how a rendering of the supplemental data would appear, while minimizing user interaction.

Thus, instead of showing the preview pane in FIG. 2H, a computing device may transition from the user interface shown in FIG. 2G to FIG. 2I. In addition, as shown in FIG. 2I, the user interface may also include one or more controls 235 for enabling a user to accept or reject the supplemental data. In the present example, the user may accept the supplemental data by selecting the "+" interface element or reject the supplemental data by selecting the "x" interface element. In this example, in response to the selection of the "+" control, the supplemental data can be integrated into the storyline data.

In some embodiments, the supplemental data can be manually selected by a user. Thus, in response to selecting a storyline item in a user interface, such as the user interface shown in FIG. 2G, the system can display a user interface for enabling a user to select a file for integration into the storyline pane. For instance, the system 100 may display the files of a resource, such as a storage drive associated with the user, a Web site, a search engine, or any other resource. The display of such files can be displayed in a preview pane, such as the one shown in FIG. 2H. Upon a user selection of one or more files, the contents of selected files may be integrated into as storyline pane in association with a selected storyline item.

Figure 2J:
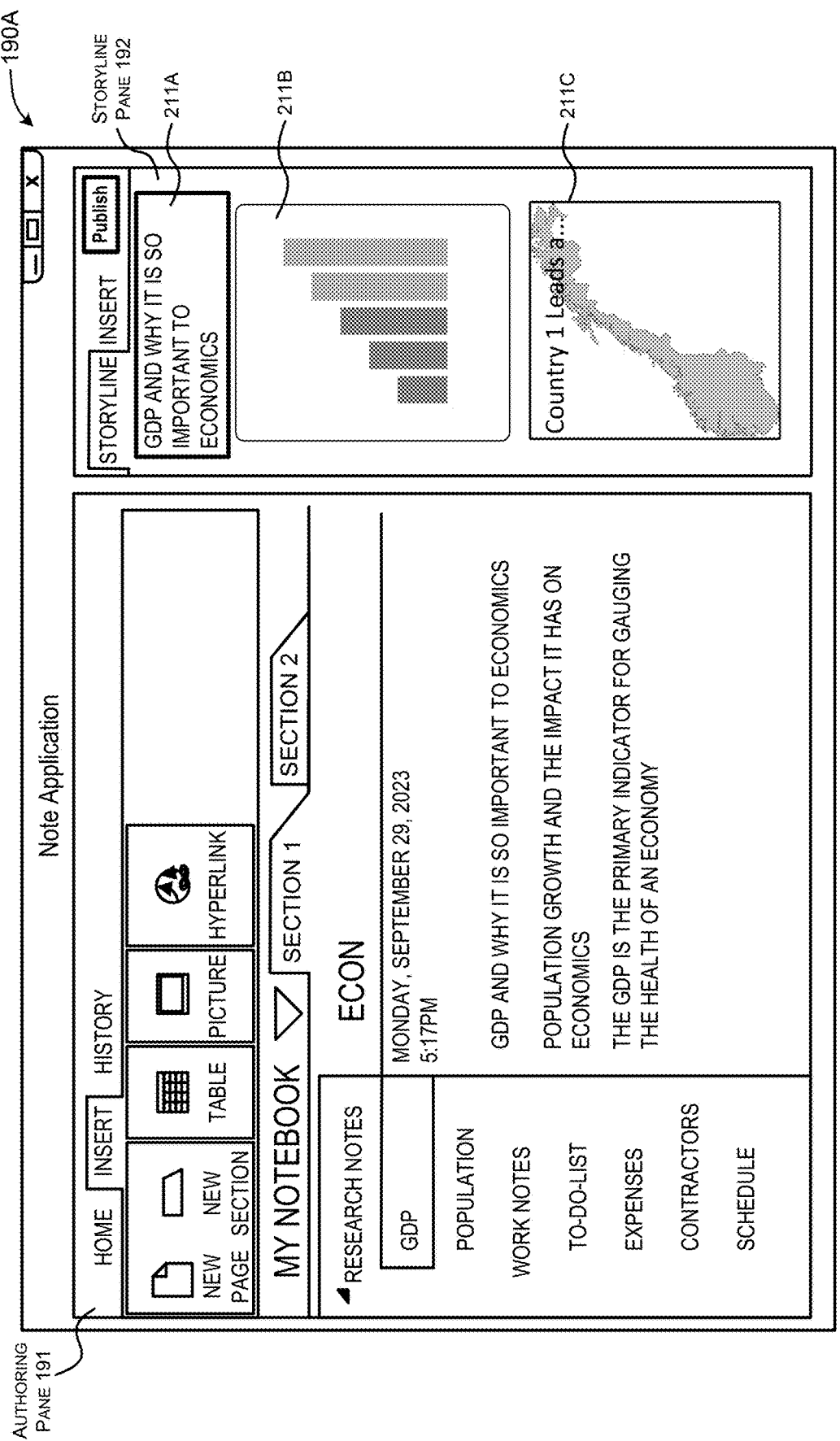
FIG. 2J is a screenshot illustrating how a storyline pane of the first application can be updated based on an update to the storyline pane of the third application.

As described herein, the storyline pane 192 of each application 141 is synchronized to enable users to work within each application 141 and view a current version of a presentation that is being compiled while also viewing authored content specific to each application 141. FIG. 2J shows another example of how a storyline pane of an application 141, the first application 141A, is updated based on updated storyline panes 192 of other applications. More specifically, FIG. 2J shows a screenshot illustrating how the storyline pane 192 of the first application 141A can be updated based on an update to the storyline pane 192 of the third application 141C.

Once the user has compiled the storyline items and the supplemental data, storyline data 151 can be generated. As summarized above, the storyline data 151 can be in a Web-based format that is published through a service. In other configurations, the storyline data 151 can be in the form of a presentation file, a multi-frame image file, a video file, or any other suitable format. An example of a user interface for enabling users to invoke the generation of the storyline data 151 is shown in FIG. 2K. In this example, a user interface displays options enabling a user to select a publishing format for storyline data to be generated.

Figure 3A:
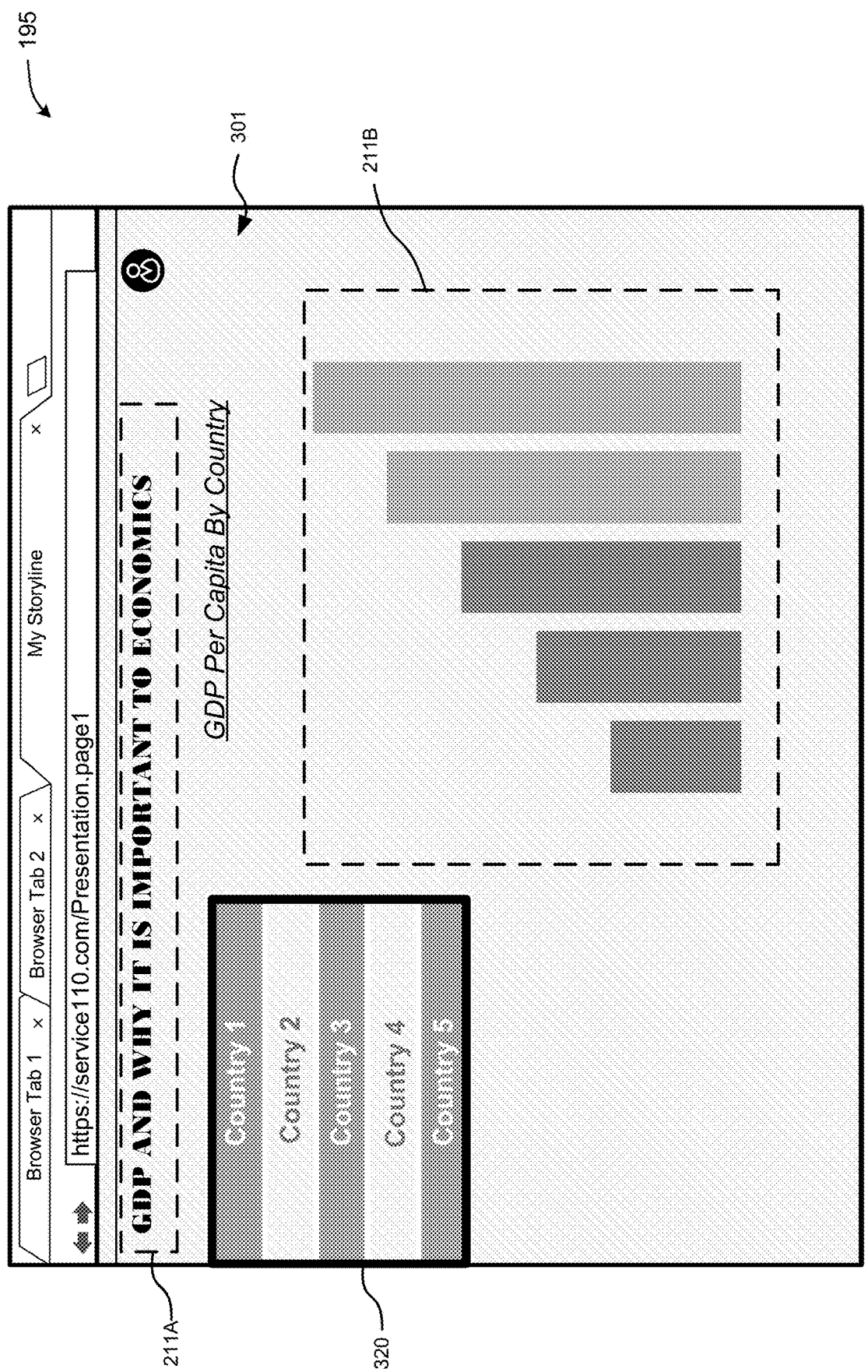
FIG. 3A illustrates one example of storyline data in a Web-based format.

FIG. 3A illustrates one example of a user interface 195 displaying a rendering 301 of the storyline data 151 in a Web-based format. As shown, the storyline items 211 can be arranged in a logical order based on the position of each storyline item 211 in the storyline pane 192. The storyline items 211 can be arranged in a logical order based on the context of each item. For instance, the first storyline item 211A is positioned above the second storyline item 211B. In addition, supplemental data can be displayed. In this example, the names associated with items of a graph are positioned near a display of the graph. The names are displayed in a user interface element 320. The system can also bring focus to emphasized items such as titles, salient data points, by the use of one or more formatting features. In this example, the title is in a larger font size and text related to the chart is in a smaller font size.

Figure 3B:
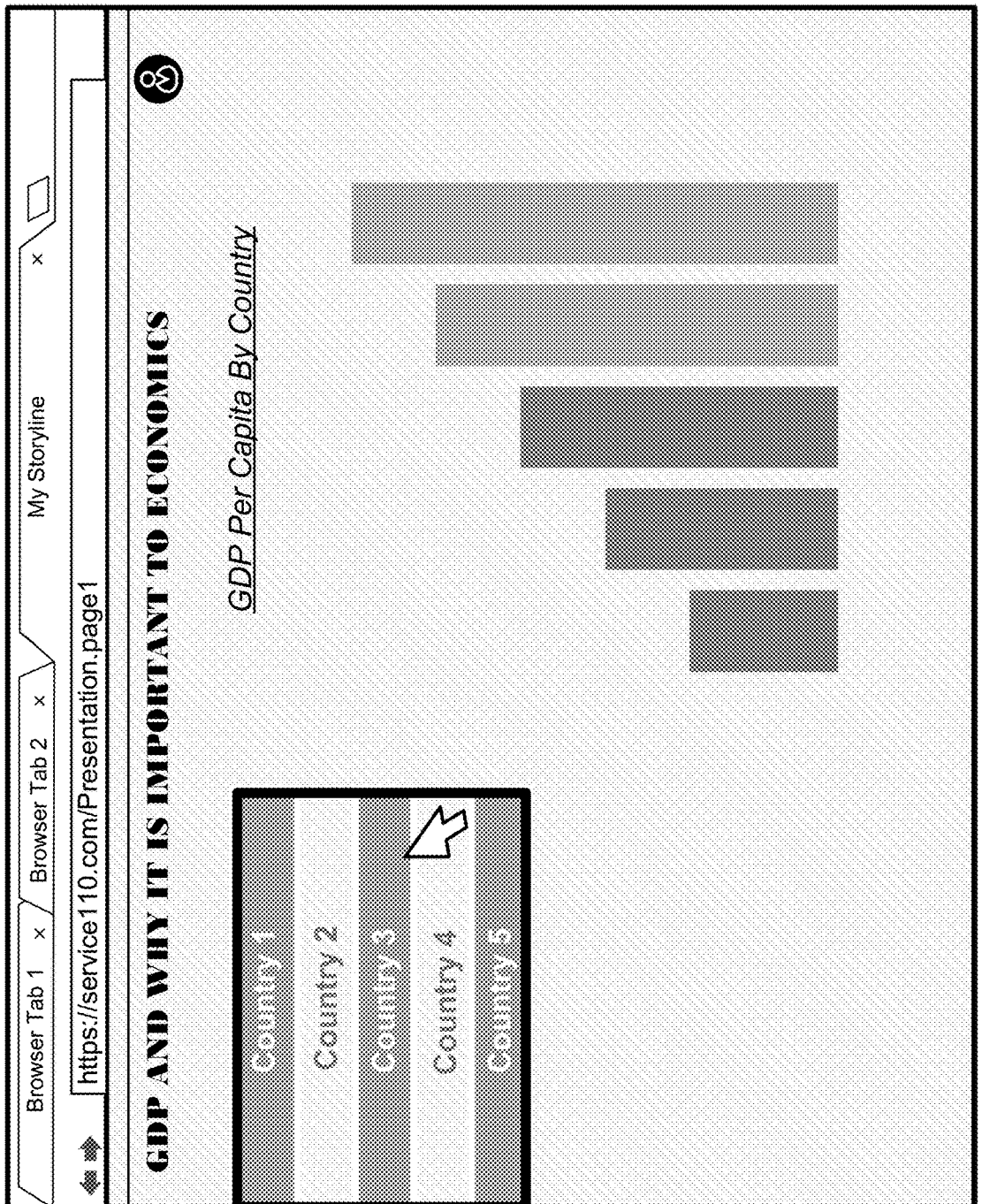
FIG. 3B illustrates an example of a user selection of a user interface element of the storyline data shown in FIG. 3A.

In addition, the user interface element 320 can be a selectable link enabling users to access supplemental data that is linked to the storyline data 151. FIG. 3B illustrates an example of a user selection of the selectable user interface element 320. In response to the selection of the user interface element 320, supplemental data can be displayed. FIG. 3C illustrates a rendering of supplemental data, also referred to herein as linked data 311, that is displayed in response to the selection of the selectable user interface element 320.

As summarized above, the storyline data can be configured to display different layouts depending on a device type or device capabilities. FIG. 3D illustrates different layouts of storyline data that can be displayed on a computing device 106 based on a device type or device capabilities, such as a screen size. In this example, when a user views the storyline data on a tablet, storyline data 151 may be presented in a first layout 351A. When the user views the same storyline data 151 on a mobile device, the storyline data 151 may be presented in a second layout 351B. This feature enables devices to maximize the use of a display area by dynamically modifying the organization and flow of a presentation.

To implement this feature, the storyline data 151, which may be in the form of a presentation file or video file, may contain metadata associating a device type with a layout. The storyline data 151 can cause a viewing application to display a predetermined layout when the storyline data 151 is accessed by a device having a predetermined type or certain capabilities. As shown in FIG. 3D, storyline data 151, such as a presentation file or media file, can associate data defining a first layout 351A and data defining aspects of a device 106. In this example, the storyline data 151 comprises data defining a first layout 351A and data defining a second layout 351B. The data defining the first layout 351A is associated with data defining aspects of a device, such as the second computing device 106B. The data defining the second layout 351B is associated with data defining aspects of another device, such as the third computing device 106C. The aspects of the device can include display capabilities, screen size, resolution dimensions, etc. The aspects of the device can also include processing power parameters, memory capacity parameters, etc. a file can also include data associating individual layouts with a particular orientation of a device. Thus, when a device detects it is being held in a vertical position, e.g., in a portrait position, a first layout may be displayed. When a device detects it is being held in a horizontal position, e.g., in a landscape position, a second layout may be displayed.

In some configurations, the generated storyline data can comprise a first layout and a second layout. The first layout can be associated with a first set of device display parameters and the second layout is associated with a second set of device display parameters. The display parameters can define an application used to view the storyline data, a screen size, a resolution or any other data related to the display capabilities of a device. The storyline data is configured to cause a viewing application to display the content using the first layout when the first set of device display parameters is detected. The storyline data causes the viewing application to display the content using the second layout when the second set of device display parameters is detected.

Figure 4A:
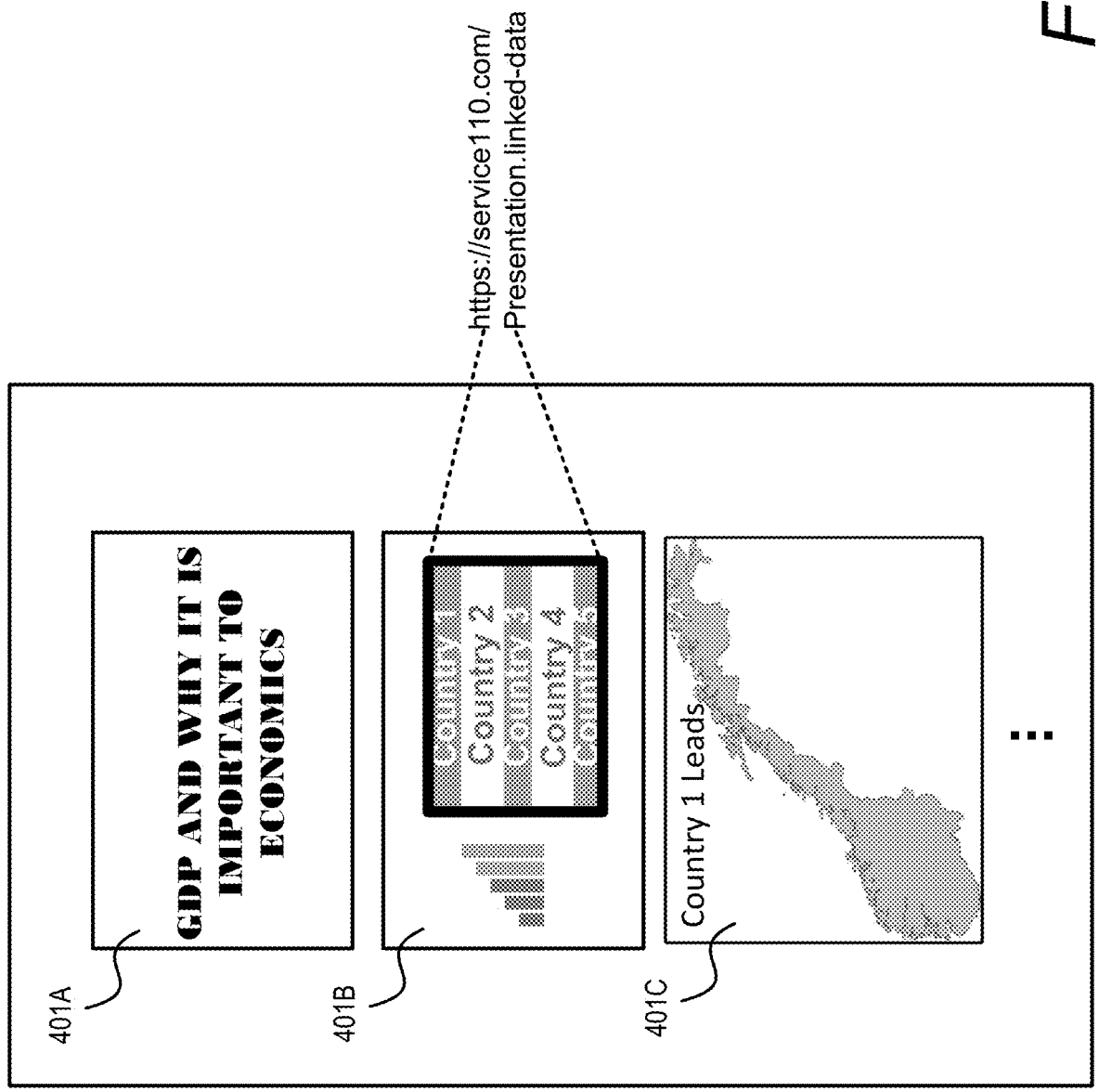
FIG. 4A illustrates a first example showing how supplemental data can be linked with the storyline data.
Figure 4B:
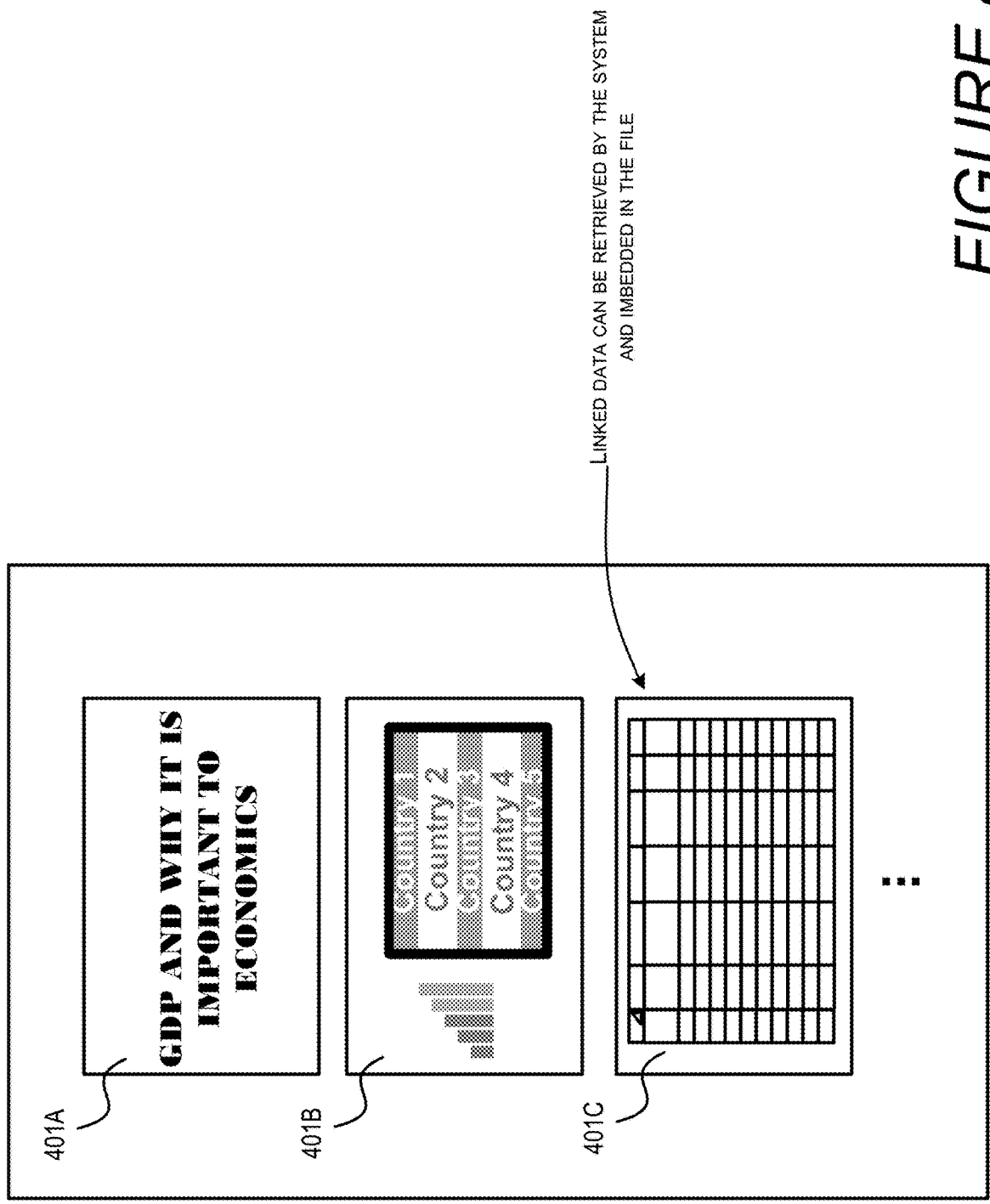
FIG. 4B illustrates a second example showing how supplemental data can be embedded within the storyline data.

FIG. 4A illustrates a first example showing how supplemental data can be associated with storyline data using links. An address, such as a URL, can be embedded into the storyline data 151 enabling users to select user interface elements 320 to access the supplemental data 152. FIG. 4B illustrates another example where the supplemental data 152 can be embedded within storyline data 151.

Figure 5:
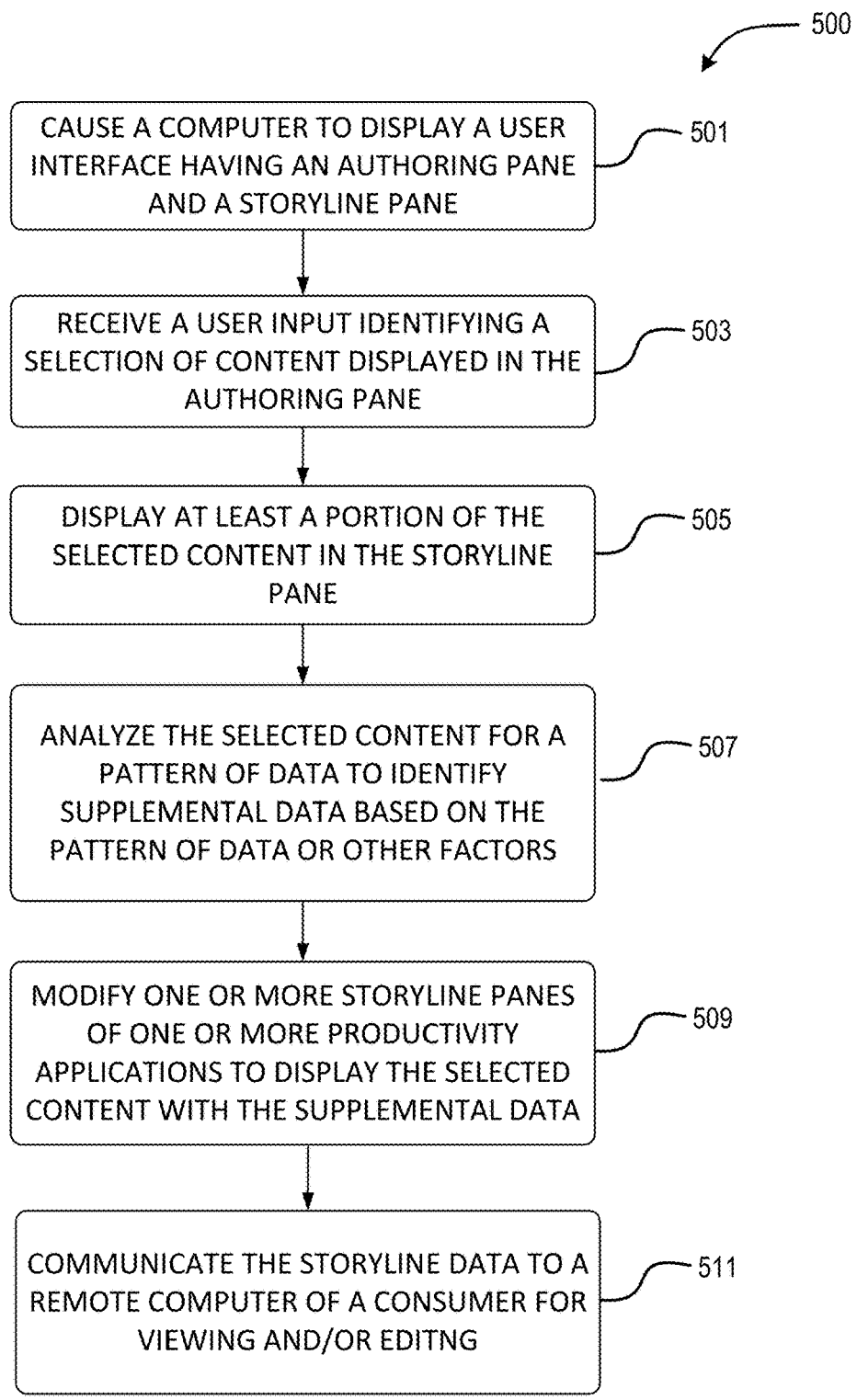
FIG. 5 is a flow diagram showing aspects of a routine for enabling the techniques disclosed herein.

Turning now to FIG. 5, aspects of a routine 500 for enabling the generation of storyline content from multiple productivity applications are shown and described below. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 500 are described herein as being implemented, at least in part, by modules running the features disclosed herein can be a dynamically linked library (DLL), a statically linked library, functionality produced by an application programming interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it can be appreciated that the operations of the routine 500 may be also implemented in many other ways. For example, the routine 500 may be implemented, at least in part, by a processor of another remote computer or a local circuit. In addition, one or more of the operations of the routine 500 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 5, the routine 500 begins at operation 501 where one or more modules of a computing system cause a display of a user interface having an authoring pane and a storyline pane. Operation 501 can include a number of implementations. For instance, a number of standalone applications can execute on a computing device, such as the computing device 106A.

In other implementations, applications can be provided by a service 110, such as Google Docs or Office 365, and user interfaces associated with the applications can be displayed on a computing device, such as the computing device 106A. In such implementations, a server can communicate data defining a plurality of applications to a client computing device. Individual applications of the plurality of applications are each configured to author content of a predetermined file type. The applications each cause a display of a plurality of user interfaces. A single user interface of the plurality of user interfaces can be associated with a first application of the plurality of applications, and the user interface can comprise an authoring pane and a storyline pane.

The techniques disclosed herein can be implemented by the use of a plug-in to a browser or other application for displaying documents and other graphical data. In some implementations, the functionality disclosed herein can be part of a plug-in application that causes existing applications to display a storyline pane concurrently with an authoring pane. Synchronization of data displayed in the storyline pains can be enabled by an application programming interface (API) provided by the applications 141 or plug-ins for the applications 141. These examples are provided for illustrative purposes and are not to be construed as limiting.

Next, at operation 503, one or more modules of a computing system can receive a user input identifying the selection of content displayed in the authoring pane. Operation 503 can involve a number of devices, such as a microphone, a pointing device, a camera, a keyboard, a touchscreen, or any other device operable for receiving a user input. Portions of displayed content can be selected from the authoring pane. In some illustrative examples, a voice command can be used to select portions of the content, a pointing device can be used to select portions of the content, or any other user gesture can be captured by a camera or other imaging device to identify select portions of the displayed content.

In response to the selection of content, the one or more modules may also execute operations for processing supplemental data. For example, with reference to FIG. 1 and FIG. 2D, when a graph is selected by a user and the graph is supported by underlying data, e.g., data of a spreadsheet file stored locally on a device, the underlying data supporting the graph stored in the spreadsheet file can be communicated to the service 110. The service 110 can publish the underlying data enabling a user to view the underlying data via a link embedded within the storyline data 151. The storyline data 151 can be configured with a link, and the storyline data can be configured to display the underlying data to a consumer, e.g., a viewer, of the storyline data 151, upon selection of the link. Alternatively, the underlying data can be embedded in the storyline data 151 and optionally displayed to a consumer.

For illustrative purposes, supplemental data can include any data that supports or is related to selected content. With reference to the examples shown in FIG. 2D and FIG. 2E, supplemental data may include spreadsheet data that is used to define a selected graph. In some configurations, when an item such as a graph is selected, the data supporting the graph is automatically uploaded to a service and published via a secured or public link. Alternatively, or in conjunction with such techniques, the supplemental data can be included in, e.g., written to, the storyline data 151. In systems where supplemental data may be stored at a server, the supplemental data may be downloaded from a service to a computing device and integrated into the storyline data 151.

Next, at operation 505, one or more modules of a computing system can cause the selected content to be displayed in the storyline pane. In response to a selection of content in the authoring pane, the selected content is displayed in the storyline pane. The display of the selected content can be in the form of a user interface element referred to herein as a storyline item. The storyline item can display at least a portion of the selected content. For illustrative purposes, content that is selected by a user or computer is referred to herein as "selected content" or a "selection of content."

In some configurations, the selected content can be positioned in a particular order within the storyline pane to define a storyline. A user input can be used to determine a position of each portion of selected content, e.g., each storyline item, and the position of each storyline item and other contextual data can be used to determine a layout of the storyline items for the storyline data that is generated. The order of the storyline items and other contextual data can be used to assign semantics and determine general formatting parameters for the storyline items.

Emphasis can be made on storyline items based on the contextual analysis of each storyline item. A priority value can be generated for each storyline item based on the contextual analysis of each storyline item. The priority value associated with some of the storyline items can be used to determine assigned semantics or an assigned format for individual storyline items. Operation 505, or other operations disclosed herein, may also involve uploading supplemental data to the service 110. For example, if the selected content involves a chart, the underlying data defining the chart may be uploaded to the service 110 and provided to one or more computers via a link to the underlying data. As described herein, the link to the underlying data be embedded into the storyline data 151 or the underlying data may be directly embedded into the storyline data 151.

Next, at operation 507, one or more modules of a computing device can analyze the selected content to identify or generate visualizations and other supplemental data associated with the selected content. For example, a computing device can determine a context of content selected by a user, and by identifying certain patterns of data, e.g., salient points, pivot charts, type of formulas used, and other patterns or a derived context, the computing device can search for visual data to be integrated into or linked to the storyline data 151. The supplemental data, such as a visualization, can be selected based on a number of factors, some of which may include results from data defining a previous analysis, similar or disparate workbooks, and/or other data sets.

In one illustrative example, the selected content can include a pattern of data or data that represents a topic. In operation 507, one or more computing devices of the system 100 can generate a query to a resource such as a search engine or a storage device. The query can include an indication of the topic or a pattern of data or other information such as a formula used in a particular file. The query can cause the retrieval of supplemental data related to the topic, pattern of data, or other information provided in the query. This processing can be associated with a user or a predetermined group of users. For example, a query for supplemental data may be limited to storage accounts for a user or a group of users.

Supplemental data can also be generated by one or more computing devices of the system 100. For instance, a topic or context can be identified by an analysis of the selected content. The topic or context of the selected content can be used to generate a headline, title, or any other text related to the selected content. In addition, the topic or context derived from the selected content can be used to generate an image or video related to the selected content.

Next, at operation 509, one or more modules of a computing device can modify one or more storyline panes of one or more productivity applications to display at least the portion of the selected content and/or the supplemental data. The storyline pane of each application is synchronized to enable users to work within each application and view a current version of a presentation that is being compiled while also viewing authored content specific to each application. Thus, for example, any updates to a storyline pane and a word processing application will cause the storyline pane in other applications to receive and display such updates.

Next, at operation 511, or more modules of a computing device can communicate the storyline data 151 to one or more computers related to consumers for viewing and/or editing. In some configurations, the one or more computing devices 106B-106N associated with the consumer, e.g., recipient, can cause the display of the storyline data 151 in a viewing mode. Thus, the consumer can see the data as it is presented in FIGS. 3A through 3C. The consumer can also edit the storyline data 151 by the use of editing tools of an application. The consumer, for instance, can view and edit the storyline items of the storyline data 151 in an application having a storyline pane 192. Once the consumer is done editing the storyline data 151, the consumer can cause an application to transition to a viewing mode and present the storyline data 151, e.g., as shown in FIGS. 3A through 3C.

Figure 6:
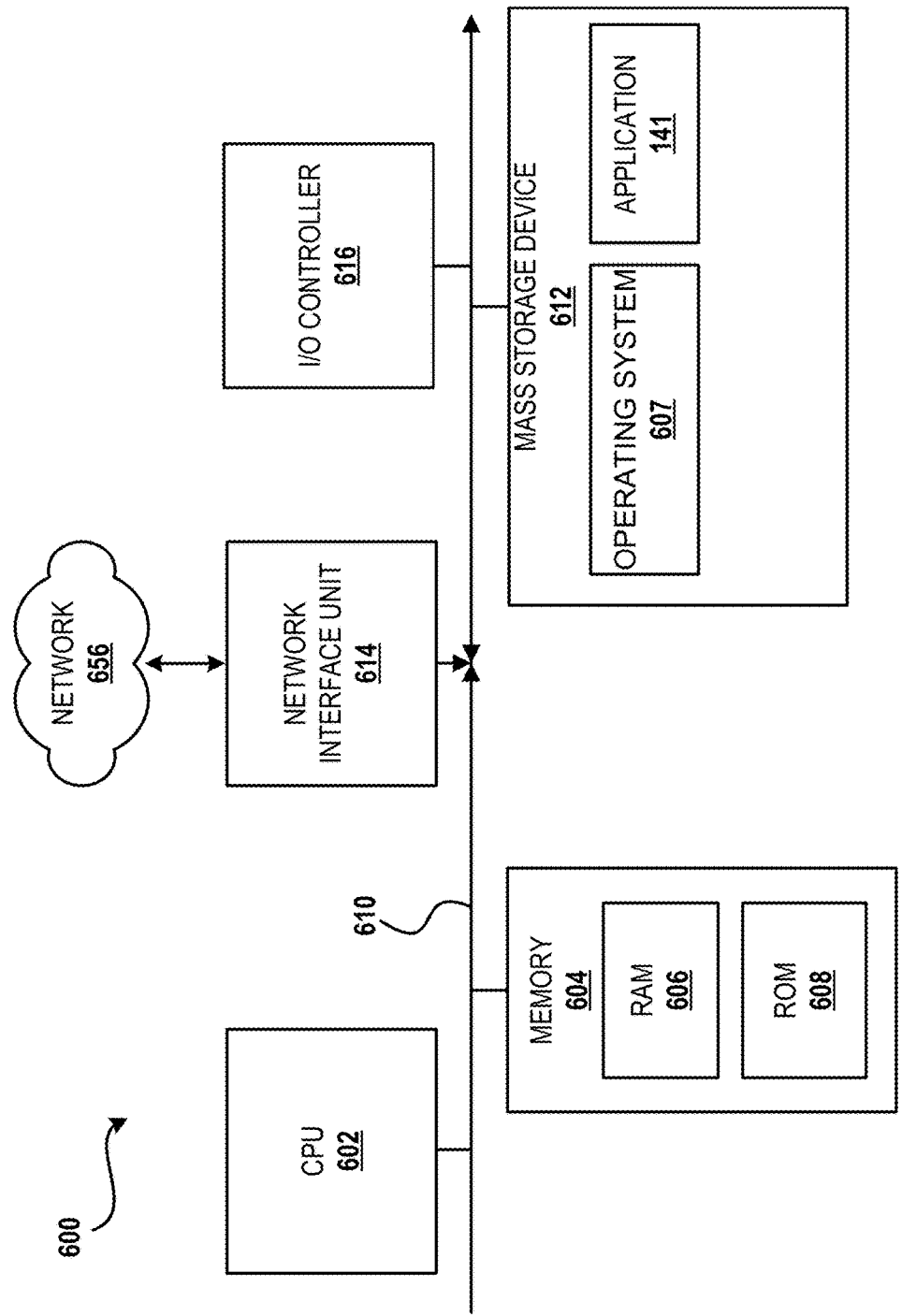
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a computer, such as the computing device 106 (FIG. 1), capable of executing the program components described herein. Thus, the computer architecture 600 illustrated in FIG. 6 illustrates an architecture for a server computer, a mobile phone, a PDA, a smart phone, a desktop computer, a netbook computer, a tablet computer, and/or a laptop computer. The computer architecture 600 may be utilized to execute any aspects of the software components presented herein.

The computer architecture 600 illustrated in FIG. 6 includes a central processing unit 602 ("CPU"), a system memory 604, including a random access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing an operating system 607, other data, and one or more application programs 141.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes of the claims, the phrase "computer storage medium," "computer-readable storage medium" and variations thereof, does not include waves, signals, and/or other transitory and/or intangible communication media, per se.

According to various configurations, the computer architecture 600 may operate in a networked environment using logical connections to remote computers through the network 656 and/or another network (not shown). The computer architecture 600 may connect to the network 656 through a network interface unit 614 connected to the bus 610. It should be appreciated that the network interface unit 614 also may be utilized to connect to other types of networks and remote computer systems. The computer architecture 600 also may include an input/output controller 616 for receiving and processing input from a number of other devices, including a keyboard, mouse, or electronic stylus (not shown in FIG. 6). Similarly, the input/output controller 616 may provide output to a display screen, a printer, or other type of output device (also not shown in FIG. 6).

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

FIG. 7 depicts an illustrative distributed computing environment 700 capable of executing the software components described herein. Thus, the distributed computing environment 700 illustrated in FIG. 7 can be utilized to execute any aspects of the software components presented herein. For example, the distributed computing environment 700 can be utilized to execute aspects of the software components described herein.

According to various implementations, the distributed computing environment 700 includes a computing environment 702 operating on, in communication with, or as part of the network 704. The network 704 may be or may include the network 656, described above with reference to FIG. 6.

The network 704 also can include various access networks. One or more client devices 706A-706N (hereinafter referred to collectively and/or generically as "clients 706" and also referred to herein as computing devices 106) can communicate with the computing environment 702 via the network 704 and/or other connections (not illustrated in FIG. 7). In one illustrated configuration, the clients 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of clients 706 can communicate with the computing environment 702. Two example computing architectures for the clients 706 are illustrated and described herein with reference to FIGS. 5 and 7. It should be understood that the illustrated clients 706 and computing architectures illustrated and described herein are illustrative, and should not be construed as being limited in any way.

In the illustrated configuration, the computing environment 702 includes application servers 708, data storage 710, and one or more network interfaces 712. According to various implementations, the functionality of the application servers 708 can be provided by one or more server computers that are executing as part of, or in communication with, the network 704. The application servers 708 can host various services, virtual machines, portals, and/or other resources. In the illustrated configuration, the application servers 708 host one or more virtual machines 714 for hosting applications or other functionality. According to various implementations, the virtual machines 714 host one or more applications and/or software modules for enabling the generation of storyline content from multiple productivity applications. It should be understood that this configuration is illustrative, and should not be construed as being limiting in any way. The application servers 708 also host or provide access to one or more portals, link pages, Web sites, and/or other information ("Web portals") 716.

According to various implementations, the application servers 708 also include one or more mailbox services 718 and one or more messaging services 720. The mailbox services 718 can include electronic mail ("email") services. The mailbox services 718 also can include various personal information management ("PIM") and presence services including, but not limited to, calendar services, contact management services, collaboration services, and/or other services. The messaging services 720 can include, but are not limited to, instant messaging services, chat services, forum services, and/or other communication services.

The application servers 708 also may include one or more social networking services 722. The social networking services 722 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 722 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 722 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 722 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 722 are not mentioned herein for the sake of brevity. As such, the above configurations are illustrative, and should not be construed as being limited in any way. According to various implementations, the social networking services 722 may host one or more applications and/or software modules for providing the functionality described herein, such as enabling the generation of storyline content from multiple productivity applications. For instance, any one of the application servers 708 may communicate or facilitate the functionality and features described herein. For instance, a social networking application, mail client, messaging client or a browser running on a phone or any other client 706 may communicate with a networking service 722 and facilitate the functionality, even in part, described above with respect to FIG. 7. Any device or service depicted herein can be used as a resource for supplemental data, including email servers, storage servers, etc.

As shown in FIG. 7, the application servers 708 also can host other services, applications, portals, and/or other resources ("other resources") 724. The other resources 724 can include, but are not limited to, document sharing, rendering or any other functionality. It thus can be appreciated that the computing environment 702 can provide integration of the concepts and technologies disclosed herein with various mailbox, messaging, social networking, and/or other services or resources.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more server computers configured to host data for the computing environment 702. The data storage 710 can include, host, or provide one or more real or virtual datastores 726A-726N (hereinafter referred to collectively and/or generically as "datastores 726"). The datastores 726 are configured to host data used or created by the application servers 708 and/or other data. Although not illustrated in FIG. 7, the datastores 726 also can host or store web page documents, word documents, presentation documents, data structures, algorithms for execution by a recommendation engine, and/or other data utilized by any application program or another module. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including, but not limited to, the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects. In one specific example, as summarized above, techniques described herein may be implemented, at least in part, by web browser application, which works in conjunction with the application servers 708 of FIG. 7.

Turning now to FIG. 8, an illustrative computing device architecture 800 for a computing device that is capable of executing various software components described herein for enabling the generation of storyline content from multiple productivity applications. The computing device architecture 800 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 800 is applicable to any of the computing devices shown in FIG. 1 and FIG. 7. Moreover, aspects of the computing device architecture 800 may be applicable to traditional desktop computers, portable computers (e.g., phones, laptops, notebooks, ultra-portables, and netbooks), server computers, and other computer systems, such as described herein with reference to FIG. 1 and FIG. 7. For example, the single touch and multi-touch aspects disclosed herein below may be applied to desktop computers that utilize a touchscreen or some other touch-enabled device, such as a touch-enabled track pad or touch-enabled mouse.

The computing device architecture 800 illustrated in FIG. 8 includes a processor 802, memory components 804, network connectivity components 806, sensor components 808, input/output components 810, and power components 812. In the illustrated configuration, the processor 802 is in communication with the memory components 804, the network connectivity components 806, the sensor components 808, the input/output ("I/O") components 810, and the power components 812. Although no connections are shown between the individuals components illustrated in FIG. 8, the components can interact to carry out device functions. In some configurations, the components are arranged so as to communicate via one or more busses (not shown).

The processor 802 includes a central processing unit ("CPU") configured to process data, execute computer-executable instructions of one or more application programs, and communicate with other components of the computing device architecture 800 in order to perform various functionality described herein. The processor 802 may be utilized to execute aspects of the software components presented herein and, particularly, those that utilize, at least in part, a touch-enabled input.

In some configurations, the processor 802 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 802 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 802 is, or is included in, a system-on-chip ("SoC") along with one or more of the other components described herein below. For example, the SoC may include the processor 802, a GPU, one or more of the network connectivity components 806, and one or more of the sensor components 808. In some configurations, the processor 802 is fabricated, in part, utilizing a package-on-package ("PoP") integrated circuit packaging technique. The processor 802 may be a single core or multi-core processor.

The processor 802 may be created in accordance with an ARM architecture, available for license from ARM HOLDINGS of Cambridge, United Kingdom. Alternatively, the processor 802 may be created in accordance with an x86 architecture, such as is available from INTEL CORPORATION of Mountain View, Calif. and others. In some configurations, the processor 802 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 804 include a random access memory ("RAM") 814, a read-only memory ("ROM") 816, an integrated storage memory ("integrated storage") 818, and a removable storage memory ("removable storage") 820. In some configurations, the RAM 814 or a portion thereof, the ROM 816 or a portion thereof, and/or some combination of the RAM 814 and the ROM 816 is integrated in the processor 802. In some configurations, the ROM 816 is configured to store a firmware, an operating system or a portion thereof (e.g., operating system kernel), and/or a bootloader to load an operating system kernel from the integrated storage 818 and/or the removable storage 820.

The integrated storage 818 can include a solid-state memory, a hard disk, or a combination of solid-state memory and a hard disk. The integrated storage 818 may be soldered or otherwise connected to a logic board upon which the processor 802 and other components described herein also may be connected. As such, the integrated storage 818 is integrated in the computing device. The integrated storage 818 is configured to store an operating system or portions thereof, application programs, data, and other software components described herein.

The removable storage 820 can include a solid-state memory, a hard disk, or a combination of solid-state memory and a hard disk. In some configurations, the removable storage 820 is provided in lieu of the integrated storage 818. In other configurations, the removable storage 820 is provided as additional optional storage. In some configurations, the removable storage 820 is logically combined with the integrated storage 818 such that the total available storage is made available as a total combined storage capacity. In some configurations, the total combined capacity of the integrated storage 818 and the removable storage 820 is shown to a user instead of separate storage capacities for the integrated storage 818 and the removable storage 820.

The removable storage 820 is configured to be inserted into a removable storage memory slot (not shown) or other mechanism by which the removable storage 820 is inserted and secured to facilitate a connection over which the removable storage 820 can communicate with other components of the computing device, such as the processor 802. The removable storage 820 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 804 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from the network 856 or another network, which may be a WWAN, a WLAN, or a WPAN. Although only the network 856 is illustrated, the network connectivity components 806 may facilitate simultaneous communication with multiple networks, including the network 604 of FIG. 6. For example, the network connectivity components 806 may facilitate simultaneous communications with multiple networks via one or more of a WWAN, a WLAN, or a WPAN.

The network 856 may be or may include a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 856 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 856 may be configured to provide voice and/or data communications with any combination of the above technologies. The network 856 may be configured to or adapted to provide voice and/or data communications in accordance with future generation technologies.

In some configurations, the WWAN component 822 is configured to provide dual-multi-mode connectivity to the network 856. For example, the WWAN component 822 may be configured to provide connectivity to the network 856, wherein the network 856 provides service via GSM and UMTS technologies, or via some other combination of technologies. Alternatively, multiple WWAN components 822 may be utilized to perform such functionality, and/or provide additional functionality to support other non-compatible technologies (i.e., incapable of being supported by a single WWAN component). The WWAN component 822 may facilitate similar connectivity to multiple networks (e.g., a UMTS network and an LTE network).

The network 856 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 824 is configured to connect to the network 856 via the WI-FI access points. Such connections may be secured via various encryption technologies including, but not limited, WI-FI Protected Access ("WPA"), WPA2, Wired Equivalent Privacy ("WEP"), and the like.

The network 856 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 826 is configured to facilitate communications with other devices, such as peripherals, computers, or other computing devices via the WPAN.

The sensor components 808 include a magnetometer 828, an ambient light sensor 830, a proximity sensor 832, an accelerometer 834, a gyroscope 836, and a Global Positioning System sensor ("GPS sensor") 838. It is contemplated that other sensors, such as, but not limited to, temperature sensors or shock detection sensors, also may be incorporated in the computing device architecture 800.

The magnetometer 828 is configured to measure the strength and direction of a magnetic field. In some configurations the magnetometer 828 provides measurements to a compass application program stored within one of the memory components 804 in order to provide a user with accurate directions in a frame of reference including the cardinal directions, north, south, east, and west. Similar measurements may be provided to a navigation application program that includes a compass component. Other uses of measurements obtained by the magnetometer 828 are contemplated.

The ambient light sensor 830 is configured to measure ambient light. In some configurations, the ambient light sensor 830 provides measurements to an application program stored within one the memory components 804 in order to automatically adjust the brightness of a display (described below) to compensate for low-light and high-light environments. Other uses of measurements obtained by the ambient light sensor 830 are contemplated.

The proximity sensor 832 is configured to detect the presence of an object or thing in proximity to the computing device without direct contact. In some configurations, the proximity sensor 832 detects the presence of a user's body (e.g., the user's face) and provides this information to an application program stored within one of the memory components 804 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 832 are contemplated.

The accelerometer 834 is configured to measure proper acceleration. In some configurations, output from the accelerometer 834 is used by an application program as an input mechanism to control some functionality of the application program. For example, the application program may be a video game in which a character, a portion thereof, or an object is moved or otherwise manipulated in response to input received via the accelerometer 834. In some configurations, output from the accelerometer 834 is provided to an application program for use in switching between landscape and portrait modes, calculating coordinate acceleration, or detecting a fall. Other uses of the accelerometer 834 are contemplated.

The gyroscope 836 is configured to measure and maintain orientation. In some configurations, output from the gyroscope 836 is used by an application program as an input mechanism to control some functionality of the application program. For example, the gyroscope 836 can be used for accurate recognition of movement within a 3D environment of a video game application or some other application. In some configurations, an application program utilizes output from the gyroscope 836 and the accelerometer 834 to enhance control of some functionality of the application program. Other uses of the gyroscope 836 are contemplated.

The GPS sensor 838 is configured to receive signals from GPS satellites for use in calculating a location. The location calculated by the GPS sensor 838 may be used by any application program that requires or benefits from location information. For example, the location calculated by the GPS sensor 838 may be used with a navigation application program to provide directions from the location to a destination or directions from the destination to the location. Moreover, the GPS sensor 838 may be used to provide location information to an external location-based service, such as E911 service. The GPS sensor 838 may obtain location information generated via WI-FI, WIMAX, and/or cellular triangulation techniques utilizing one or more of the network connectivity components 806 to aid the GPS sensor 838 in obtaining a location fix. The GPS sensor 838 may also be used in Assisted GPS ("A-GPS") systems. The GPS sensor 838 can also operate in conjunction with other components, such as the processor 802, to generate positioning data for the computing device 800.

The I/O components 810 include a display 840, a touchscreen 842, a data I/O interface component ("data I/O") 844, an audio I/O interface component ("audio I/O") 846, a video I/O interface component ("video I/O") 848, and a camera 850. In some configurations, the display 840 and the touchscreen 842 are combined. In some configurations two or more of the data I/O component 844, the audio I/O component 846, and the video I/O component 848 are combined. The I/O components 810 may include discrete processors configured to support the various interface described below, or may include processing functionality built-in to the processor 802.

The display 840 is an output device configured to present information in a visual form. In particular, the display 840 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 840 is a liquid crystal display ("LCD") utilizing any active or passive matrix technology and any backlighting technology (if used). In some configurations, the display 840 is an organic light emitting diode ("OLED") display. Other display types are contemplated.

The touchscreen 842, also referred to herein as a "touch-enabled screen," is an input device configured to detect the presence and location of a touch. The touchscreen 842 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 842 is incorporated on top of the display 840 as a transparent layer to enable a user to use one or more touches to interact with objects or other information presented on the display 840. In other configurations, the touchscreen 842 is a touch pad incorporated on a surface of the computing device that does not include the display 840. For example, the computing device may have a touchscreen incorporated on top of the display 840 and a touch pad on a surface opposite the display 840.

In some configurations, the touchscreen 842 is a single-touch touchscreen. In other configurations, the touchscreen 842 is a multi-touch touchscreen. In some configurations, the touchscreen 842 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 842. As such, a developer may create gestures that are specific to a particular application program.

In some configurations, the touchscreen 842 supports a tap gesture in which a user taps the touchscreen 842 once on an item presented on the display 840. The tap gesture may be used for various reasons including, but not limited to, opening or launching whatever the user taps. In some configurations, the touchscreen 842 supports a double tap gesture in which a user taps the touchscreen 842 twice on an item presented on the display 840. The double tap gesture may be used for various reasons including, but not limited to, zooming in or zooming out in stages. In some configurations, the touchscreen 842 supports a tap and hold gesture in which a user taps the touchscreen 842 and maintains contact for at least a pre-defined time. The tap and hold gesture may be used for various reasons including, but not limited to, opening a context-specific menu.

In some configurations, the touchscreen 842 supports a pan gesture in which a user places a finger on the touchscreen 842 and maintains contact with the touchscreen 842 while moving the finger on the touchscreen 842. The pan gesture may be used for various reasons including, but not limited to, moving through screens, images, or menus at a controlled rate. Multiple finger pan gestures are also contemplated. In some configurations, the touchscreen 842 supports a flick gesture in which a user swipes a finger in the direction the user wants the screen to move. The flick gesture may be used for various reasons including, but not limited to, scrolling horizontally or vertically through menus or pages. In some configurations, the touchscreen 842 supports a pinch and stretch gesture in which a user makes a pinching motion with two fingers (e.g., thumb and forefinger) on the touchscreen 842 or moves the two fingers apart. The pinch and stretch gesture may be used for various reasons including, but not limited to, zooming gradually in or out of a web site, map, or picture.

Although the above gestures have been described with reference to the use of one or more fingers for performing the gestures, other appendages such as toes or objects such as styluses may be used to interact with the touchscreen 842. As such, the above gestures should be understood as being illustrative and should not be construed as being limiting in any way.

The data I/O interface component 844 is configured to facilitate input of data to the computing device and output of data from the computing device. In some configurations, the data I/O interface component 844 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 846 is configured to provide audio input and/or output capabilities to the computing device. In some configurations, the audio I/O interface component 846 includes a microphone configured to collect audio signals. In some configurations, the audio I/O interface component 846 includes a headphone jack configured to provide connectivity for headphones or other external speakers. In some configurations, the audio I/O interface component 846 includes a speaker for the output of audio signals. In some configurations, the audio I/O interface component 846 includes an optical audio cable out.

The video I/O interface component 848 is configured to provide video input and/or output capabilities to the computing device. In some configurations, the video I/O interface component 848 includes a video connector configured to receive video as input from another device (e.g., a video media player such as a DVD or BLURAY player) or send video as output to another device (e.g., a monitor, a television, or some other external display). In some configurations, the video I/O interface component 848 includes a High-Definition Multimedia Interface ("HDMI"), mini-HDMI, micro-HDMI, DisplayPort, or proprietary connector to input/output video content. In some configurations, the video I/O interface component 848 or portions thereof is combined with the audio I/O interface component 846 or portions thereof.

The camera 850 can be configured to capture still images and/or video. The camera 850 may utilize a charge coupled device ("CCD") or a complementary metal oxide semiconductor ("CMOS") image sensor to capture images. In some configurations, the camera 850 includes a flash to aid in taking pictures in low-light environments. Settings for the camera 850 may be implemented as hardware or software buttons.

Although not illustrated, one or more hardware buttons may also be included in the computing device architecture 800. The hardware buttons may be used for controlling some operational aspect of the computing device. The hardware buttons may be dedicated buttons or multi-use buttons. The hardware buttons may be mechanical or sensor-based.

The illustrated power components 812 include one or more batteries 852, which can be connected to a battery gauge 854. The batteries 852 may be rechargeable or disposable. Rechargeable battery types include, but are not limited to, lithium polymer, lithium ion, nickel cadmium, and nickel metal hydride. Each of the batteries 852 may be made of one or more cells.

The battery gauge 854 can be configured to measure battery parameters such as current, voltage, and temperature. In some configurations, the battery gauge 854 is configured to measure the effect of a battery's discharge rate, temperature, age and other factors to predict remaining life within a certain percentage of error. In some configurations, the battery gauge 854 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 812 may also include a power connector, which may be combined with one or more of the aforementioned I/O components 810. The power components 812 may interface with an external power system or charging equipment via an I/O component.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A system comprising:
one or more processing units; and
a non-transitory computer-readable medium having encoded thereon computer-executable instructions to cause the one or more processing units to
execute a first application for editing content of a first file having a first file type;
display a first user interface associated with the first application, wherein the first user interface concurrently displays an authoring pane and a first storyline pane, the authoring pane for editing the content of the first file;
receive a user input identifying a selection of content from the content displayed in the authoring pane;

display a rendering of at least a portion of the selection of content in the first storyline pane;
analyze the selection of content to determine a pattern of data;
identify supplemental data based on the pattern of data;
update the first storyline pane to display a rendering of the supplemental data;
communicate the supplemental data to a second application for editing content of a second file having a second file type, the communication causing the second application to display the supplemental data in a second storyline pane of a second user interface, the second storyline pane is synchronized with the first storyline pane of the first user interface, wherein the second storyline pane of the second user interface displays
the supplemental data concurrently with the content of the second file with the selection of content; and
generating storyline data configured to display content compiled in the first storyline pane and the second storyline pane, wherein the first storyline pane and the second storyline pane are synchronized such that the selection of content of the first file selected for display in the first storyline pane of the first application is displayed in the second storyline pane and a selection of content of the second file selected for display in the second storyline pane of the second application is displayed in the first storyline pane.

2. The system of claim 1, wherein the computer-executable instructions further cause the one or more processing units to generate storyline data in the form of a document configured to display the selection of content and the supplemental data in a storyline format.

3. The system of claim 2, wherein the storyline data can comprise a first layout and a second layout, wherein the first layout is associated with a first set of device display parameters and the second layout is associated with a second set of device display parameters, wherein the storyline data causes a viewing application to display the content using the first layout when the first set of device display parameters is detected, and wherein the storyline data causes the viewing application to display the content using the second layout when the second set of device display parameters is detected.

4. The system of claim 1, wherein the computer-executable instructions further cause the one or more processing units to:
determine a position for the selection of content within the storyline pane, wherein the portion of the selection of content is displayed in the storyline pane based on the position; and
generate storyline data having an organized storyline flow for displaying the selection of content and the supplemental data, wherein the organized storyline flow is based on the position for the selection of content relative to a position of other selected content displayed in the storyline pane.

5. The system of claim 1, wherein the supplemental data is identified for display of the supplemental data in association with the selection of content within the second storyline pane.

6. The system of claim 1, wherein the supplemental data is identified for display of the supplemental data in association with the selection of content within the first storyline pane and within the second storyline pane.

7. The system of claim 1, wherein the storyline data comprises a graphical element representing a dataset, wherein the dataset is embedded within the storyline data in response to a selection of the graphical element for display of the first storyline pane and the second storyline pane, the storyline data configured to display a rendering of the dataset in response to a selection of a rendering of the graphical element.

8. The system of claim 1, wherein the storyline data comprises a graphical element representing a dataset, wherein a link to the dataset is provided within the storyline data in response to a selection of the graphical element for display of the first storyline pane and the second storyline pane, the storyline data configured to display a rendering of the dataset in response to a selection of a rendering of the graphical element.

9. A system comprising:
one or more processing units; and
a non-transitory computer-readable medium having encoded thereon computer-executable instructions to cause the one or more processing units to
execute a plurality of applications, wherein individual applications of the plurality of applications are each configured to edit content of a predetermined file type;
display a first user interface of a first application of the plurality of applications, the first user interface concurrently displays a first authoring pane and a first storyline pane, wherein a second user interface of a second application of the plurality of applications concurrently displays a second authoring pane and a second storyline pane;
receive a user input associated with the first application identifying a selection of content displayed in the first authoring pane to identify selected content;
determine a position of the selected content for display within the first storyline pane;
display at least a portion of the selected content in the first storyline pane as a storyline item based on the position;
communicate the selected content to a second application of the plurality of applications for editing content of a second file having a second file type, the communication causing the second application to display the selected content in the second storyline pane of the second user interface, the second storyline pane is synchronized with the first storyline pane of the first user interface causing the first storyline pane to display the selected content, wherein the second storyline pane of the second user interface concurrently displays the selected content with content of the second file in a second authoring pane; and
generate storyline data having content compiled from the first storyline pane and the second storyline pane, wherein the first storyline pane and the second storyline pane are synchronized such that the selected content of the first file displayed in the first storyline pane of the first application is communicated to the second application for display in the second storyline pane and selected content of the second file displayed in the second storyline pane is communicated to the first application for display in the first storyline pane.

10. The system of claim 9, where the computer-executable instructions further cause the one or more processing units to:
analyze the selected content for a pattern of data;

identify supplemental data based on the pattern of data; and modify at least one storyline pane associated with at least one application of the plurality of applications, the at least one storyline pane to display at least a portion of the supplemental data.

11. The system of claim 10, where the computer-executable instructions further cause the one or more processing units to embed the supplemental data within the storyline data.

12. The system of claim 10, wherein the computer-executable instructions further cause the one or more processing units to generate storyline data having an organized storyline flow including the selected content and the supplemental data, wherein the organized storyline flow is based on the position of the selected content relative to a position of other selected content displayed in the storyline pane, wherein at least one storyline item of the storyline data comprises a link to underlying data supporting the content of the at least one storyline item, wherein the link is selectable by a user for causing a display of the underlying data at a computing device associated with a consumer.

13. The system of claim 9, where the computer-executable instructions further cause the one or more processing units to:
determine that the selected content is associated with a formula, a data source, a data type, an entity contained in the selected content, metadata associated with column headers, or metadata associated with row headers;
identify supplemental data based on the selected content associated with the data source, the data type, the entity contained in selected content, the metadata associated with column headers, or the metadata associated with row headers; and
modify at least one storyline pane associated with at least one application of the plurality of applications, the at least one storyline pane to display at least a portion of the supplemental data.

14. The system of claim 9, wherein the position of the selected content within the storyline pane is determined by:
analyzing the selected content to determine a context of the selected content;
analyzing one or more storyline items within the storyline pane to determine a context of the one or more storyline items; and
selecting a position of the selected content within an ordered list of the storyline items based on context of the selected content relative to the context of the one or more storyline items.

15. The system of claim 9, wherein the storyline data can comprise a first layout and a second layout, wherein the first layout is associated with a first set of device display parameters and the second layout is associated with a second set of device display parameters, wherein the storyline data causes a viewing application to display the selected content using the first layout when the first set of device display parameters is detected, and wherein the storyline data causes the viewing application to display the selected content using the second layout when the second set of device display parameters is detected.

16. A system comprising:
one or more processing units; and
a non-transitory computer-readable medium having encoded thereon computer-executable instructions to cause the one or more processing units to communicate data defining a plurality of applications to a computing device, wherein individual applications of the plurality of applications are each configured to edit a predetermined file type, the applications each cause a display of a user interface, wherein a first user interface is associated with a first application of the plurality of applications, wherein a second user interface is associated with a second application of the plurality of applications, wherein the first user interface and the second user interface each comprise an authoring pane and a storyline pane;
determine a selection of content displayed in the authoring pane of the first user interface;
determine a position of the selection of content for display within the storyline pane of the first user interface;
display the selection of content in the storyline pane as a storyline item based on the position within the storyline pane of the first user interface;
modify the storyline pane displayed with the second user interface to display the selection of content; and
generate storyline data for the display of content that is selected for display in the storyline pane of the first user interface and the storyline pane of the second user interface, wherein the storyline pane of the second user interface is synchronized with the storyline pane of the first user interface causing selected content displayed in the second storyline pane to be displayed within the storyline pane of the first user interface.

17. The system of claim 16, where the computer-executable instructions further cause the one or more processing units to:
analyze the content for a pattern of data;
identify the supplemental data based on the pattern of data; and
modify each storyline pane of the plurality of user interfaces to display at least a portion of the supplemental data.

18. The system of claim 17, where the computer-executable instructions further cause the one or more processing units to embed the supplemental data within storyline data having an organized storyline flow for displaying the content in a slide presentation format.

19. The system of claim 16, wherein the computer-executable instructions further cause the one or more processing units to generate storyline data having an organized storyline flow for displaying the content, wherein the organized storyline flow is based on the position of the content relative to a position of other selected content displayed in the storyline pane.

20. The system of claim 16, wherein the position of the content within the storyline pane is determined by:
analyzing the content to determine a context of the content;
analyzing one or more storyline items within the storyline pane to determine a context of the one or more storyline items; and
selecting a position of the content within an ordered list of the storyline items based on context of the content relative to the context of the one or more storyline items.

* * * * *